United States Patent
Lee et al.

(10) Patent No.: US 12,153,214 B2
(45) Date of Patent: Nov. 26, 2024

(54) OPTICAL DEVICE

(71) Applicant: Samsung Display Co., LTD., Yongin-si (KR)

(72) Inventors: Hyun Sup Lee, Seoul (KR); Yong Seok Kim, Seoul (KR); Jeong Woo Park, Yongin-si (KR); Dong Chul Shin, Hwaseong-si (KR); Gye Hwan Lim, Incheon (KR); Ju Hwa Ha, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 808 days.

(21) Appl. No.: 17/120,953

(22) Filed: Dec. 14, 2020

(65) Prior Publication Data
US 2021/0318540 A1    Oct. 14, 2021

(30) Foreign Application Priority Data
Apr. 13, 2020    (KR) .................. 10-2020-0044676

(51) Int. Cl.
*G02B 27/01*    (2006.01)
*F21V 8/00*    (2006.01)
*G02B 19/00*    (2006.01)

(52) U.S. Cl.
CPC ......... *G02B 27/0149* (2013.01); *G02B 6/003* (2013.01); *G02B 6/0035* (2013.01); *G02B 19/0009* (2013.01); *G02B 19/0047* (2013.01); *G02B 27/0172* (2013.01); *G02B 2027/015* (2013.01); *G02B 2027/0178* (2013.01)

(58) Field of Classification Search
CPC .... G02B 2027/0178; G02B 2027/0187; G02B 27/017; G02B 27/0977; G02B 25/001; G02B 19/00; F21V 8/00
See application file for complete search history.

(56) References Cited

U.S. PATENT DOCUMENTS

| | | | |
|---|---|---|---|
| 10,302,992 B2 * | 5/2019 | Liu | .................. G02B 27/0172 |
| 2020/0081254 A1 * | 3/2020 | Tam | .................. G02B 27/0176 |
| 2020/0285057 A1 | 9/2020 | Park et al. | |
| 2020/0292822 A1 | 9/2020 | Lee et al. | |

FOREIGN PATENT DOCUMENTS

| | | |
|---|---|---|
| CN | 111696481 | 9/2020 |
| JP | 6518659 | 5/2019 |
| KR | 10-2020-0107027 | 9/2020 |

* cited by examiner

*Primary Examiner* — William J Carter
(74) *Attorney, Agent, or Firm* — KILE PARK REED & HOUTTEMAN PLLC

(57) ABSTRACT

An optical device for realizing augmented reality comprises a lens comprising a first surface and side surfaces, a display device disposed on a first side surface among the side surfaces of the lens and displaying a first image in a first area and a second image in a second area, a first reflector disposed in the lens and reflecting the first image incident on the first side surface of the lens to the first surface, a second reflector disposed in the lens and reflecting the second image incident on the first side surface of the lens to the first surface, a first condenser disposed between the lens and the first area of the display device and focusing the first image on the first reflector, and a second condenser disposed between the lens and the second area of the display device and focusing the second image on the second reflector.

20 Claims, 19 Drawing Sheets

210 : 2110,2120,2130
220 : 2210,2220,2230
310; 311, 312, 313
320: 321, 322, 323
410: 411, 412, 413
420: 421, 422, 423

OPTICAL DEVICE

CROSS-REFERENCE TO RELATED APPLICATION(S)

This application claims priority to and benefits of Korean Patent Application No. 10-2020-0044676 under 35 U.S.C. § 119, filed on Apr. 13, 2020 in the Korean Intellectual Property Office, the entire contents of which are incorporated herein by reference.

BACKGROUND

1. Technical Field

The disclosure relates to an optical device.

2. Description of the Related Art

Augmented reality refers to a technology that superimposes a virtual image on an image of reality seen by a user's eyes and displays them as one image. The virtual image may be a text or graphic image, and the real image may be information about a real object observed in the field of view of a device. Augmented reality may be realized using a head-mounted display (HMD), head-up display (HUD), or the like.

An optical device for providing augmented reality may include optical members that provide a virtual image displayed on a display device to a user's eyes by changing a light path of the virtual image. The optical device may further include a condenser for focusing the virtual image of the display device on the optical members. Since a distance between the display device and the optical members is small, a thickness of the condenser may be increased to increase refractive power. The optical device for providing augmented reality may be provided in the form of glasses so that a user can easily carry it and can easily wear them or take them off. However, if the condenser is thick, it may be difficult to implement the optical device in the form of glasses.

SUMMARY

Embodiments of the disclosure provide an optical device for realizing augmented reality, in which a thickness of a condenser may be reduced.

According to an embodiment of the inventive concept, an optical device may comprise a lens comprising a first surface and side surfaces, a display device disposed on a first side surface among the side surfaces of the lens and displaying a first image in a first area and a second image in a second area, a first reflector disposed in the lens and reflecting the first image incident on the first side surface of the lens to the first surface, a second reflector disposed in the lens and reflecting the second image incident on the first side surface of the lens to the first surface, a first condenser disposed between the lens and the first area of the display device and focusing the first image on the first reflector, and a second condenser disposed between the lens and the second area of the display device and focusing the second image on the second reflector.

In an embodiment, the first area and the second area may be disposed in a first direction which may be a width direction of the lens, the first reflector and the second reflector may be disposed in the first direction, and the first condenser and the second condenser may be disposed in the first direction.

In an embodiment, the display device may further comprise a third area displaying a third image, and the first area, the second area, and the third area may be disposed in a first direction which may be a width direction of the lens.

In an embodiment, the optical device may further comprise a third reflector disposed in the lens and reflecting the third image incident on the first side surface of the lens to the first surface, and the first reflector, the second reflector, and the third reflector may be disposed in the first direction.

In an embodiment, the optical device may further comprise a third condenser disposed between the lens and the third area of the display device and focusing the third image on the third reflector.

In an embodiment, the display device may further comprise a fourth area displaying a fourth image, and the first area and the fourth area may be disposed in a second direction which may be a thickness direction of the lens.

In an embodiment, the optical device may further comprise a fourth reflector disposed in the lens and reflecting the fourth image incident on the first side surface of the lens to the first surface, and the first reflector and the fourth reflector may be disposed in the second direction.

In an embodiment, the optical device may further comprise a fourth condenser disposed between the lens and the fourth area of the display device and focusing the fourth image on the fourth reflector.

In an embodiment, the display device may further comprise a fifth area displaying a fifth image, the fourth area and the fifth area may be disposed in a first direction which may be a width direction of the lens, and the second area and the fifth area may be disposed in the second direction.

In an embodiment, the optical device may further comprise a fifth reflector disposed in the lens and reflecting the fifth image incident on the first side surface of the lens to the first surface. The fourth reflector and the fifth reflector may be disposed in the first direction, and the second reflector and the fifth reflector may be disposed in the second direction.

In an embodiment, the optical device may further comprise a fifth condenser disposed between the lens and the fifth area of the display device and focusing the fifth image on the fifth reflector.

In an embodiment, each of the first condenser and the second condenser may comprise a first convex lens, and a second convex lens disposed between the first convex lens and the display device.

In an embodiment, the first convex lens may be convex toward the second convex lens, and the second convex lens may be convex toward the first convex lens.

According to an embodiment of the inventive concept, an optical device may comprise a lens comprising a first surface and side surfaces, a first sub-display device disposed on a first side surface among the side surfaces of the lens and displaying a first image, a second sub-display device disposed on the first side surface of the lens and displaying a second image, a first reflector disposed in the lens and reflecting the first image incident on the first side surface of the lens to the first surface, a second reflector disposed in the lens and reflecting the second image incident on the first side surface of the lens to the first surface, a first condenser disposed between the lens and the first sub-display device and focusing the first image on the first reflector, and a second condenser disposed between the lens and the second sub-display device and focusing the second image on the second reflector.

In an embodiment, the first sub-display device and the second sub-display device may be disposed in a first direction which may be a width direction of the lens, the first reflector and the second reflector may be disposed in the first direction, and the first condenser and the second condenser may be disposed in the first direction.

In an embodiment, the optical device may further comprise a third sub-display device disposed on the first side surface and displaying a third image, and the first sub-display device, the second sub-display device, and the third sub-display device may be disposed in a first direction which may be a width direction of the lens.

In an embodiment, the optical device may further comprise a third reflector disposed in the lens and reflecting the third image incident on the first side surface of the lens to the first surface, and the first reflector, the second reflector, and the third reflector are disposed in the first direction.

In an embodiment, the optical device may further comprise a third condenser disposed between the lens and the third sub-display device and focusing the third image on the third reflector.

In an embodiment, the first sub-display device may comprise a first area displaying the first image and a fourth area displaying a fourth image, and the first area and the fourth area may be disposed in a second direction which may be a thickness direction of the lens.

In an embodiment, the optical device may further comprise a fourth reflector disposed in the lens and reflecting the fourth image incident on the first side surface of the lens to the first surface, and a fourth condenser disposed between the lens and the fourth area of the first sub-display device and focusing the fourth image on the fourth reflector. The first reflector and the fourth reflector may be disposed in the second direction.

BRIEF DESCRIPTION OF THE DRAWINGS

The above and other features of the inventive concept will become more apparent by describing in detail embodiments thereof with reference to the accompanying drawings, in which.

DETAILED DESCRIPTION OF THE EMBODIMENTS

Figure 1:
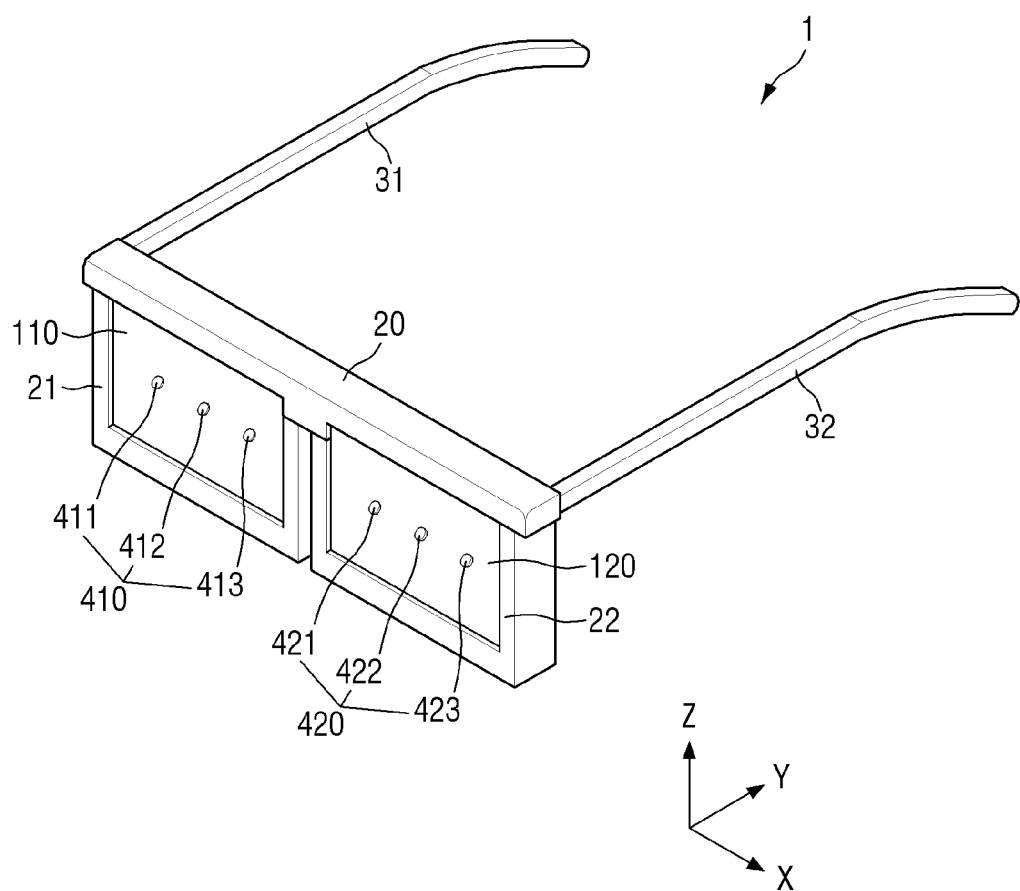
FIG. 1 is a perspective view of an optical device according to an embodiment.

Embodiments of the inventive concept will be described in greater detail hereinafter with reference to the accompanying drawings. Like reference numerals may refer to like elements throughout the accompanying drawings. In the drawings, the thickness, ratio, and dimension of components are exaggerated for effective description of the technical content.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationship between elements may be interpreted in a like fashion.

It will be further understood that the terms "comprises," "comprising," "includes," "including," "have," "having," "contains," and/or "containing" when used in this specification, are intended to specify the presence of stated features, regions, integers, steps, operations, elements, and/or components, but do not preclude the presence or addition of one or more other features, regions, integers, steps, operations, elements, components, and/or groups thereof.

It will be further understood that descriptions of features or aspects within each embodiment are available for other similar features or aspects in other embodiments, unless the context clearly indicates otherwise.

As used herein, the singular forms "a", "an" and "the" are intended to include the plural forms as well, unless the context clearly indicates otherwise. For example, "an element" has the same meaning as "at least one element," unless the context clearly indicates otherwise. The phrase "at least one" is not to be construed as limiting "a" or "an." "Or" means "and/or."

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer" or "section" discussed below could be termed a second element, component, region, layer, or section without departing from the teachings herein.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" can encompass both an orientation of above and below.

Figure 2:
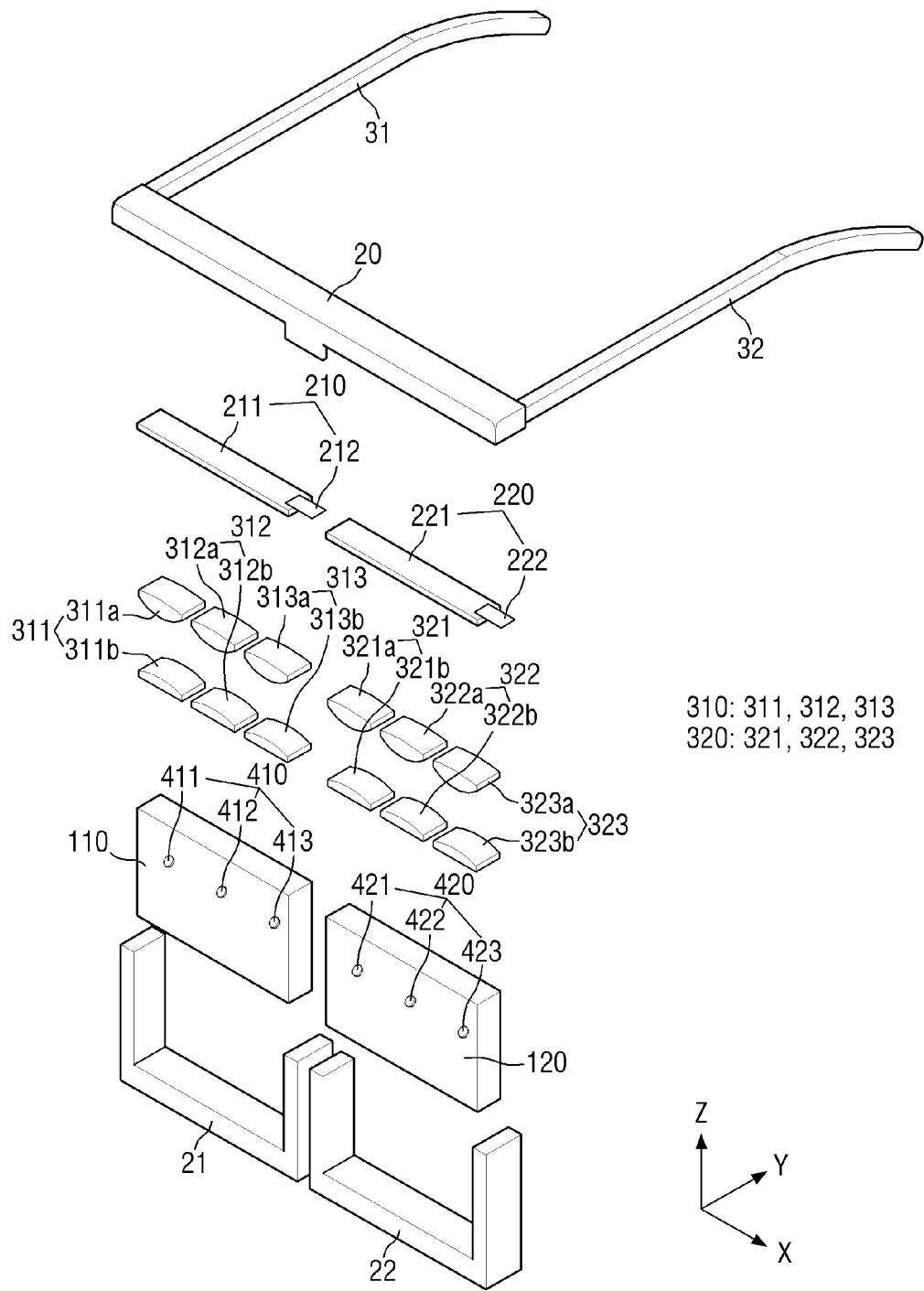
FIG. 2 is an exploded perspective view of the optical device according to the embodiment.

FIG. 1 is a perspective view of an optical device 1 according to an embodiment. FIG. 2 is an exploded perspective view of the optical device 1 according to the embodiment.

Referring to FIGS. 1 and 2, the augmented reality providing device 1 according to the embodiment includes a support frame 20, a right lens frame 21, a left lens frame 22, a first eyeglass temple 31, a second eyeglass temple 32, a right lens 110, a left lens 120, a first display device 210, a second display device 220, right condensers 310, left condensers 320, right reflectors 410, and left reflectors 420.

In the specification, a first direction (for example, an X-axis direction) may be a width direction of each of the right lens 110 and the left lens 120, a second direction (for example, a Y-axis direction) may be a thickness direction of each of the right lens 110 and the left lens 120, and a third direction (for example, a Z-axis direction) may be a height direction of each of the right lens 110 and the left lens 120.

The support frame 20 supports the right lens 110 and the left lens 120 together with the right lens frame 21 and the left lens frame 22. The right lens 110 may be surrounded by the support frame 20 and the right lens frame 21. The left lens 120 may be surrounded by the support frame 20 and the left lens frame 22.

The support frame 20 may be disposed on an upper side surface of the right lens 110 and an upper side surface of the left lens 120. The support frame 20 may extend in the first direction (X-axis direction).

The right lens frame 21 may be disposed on a left side surface, a lower side surface and a right side surface of the right lens 110. The right lens frame 21 may be physically coupled to the support frame 20. The left lens frame 22 may be disposed on a left side surface, a lower side surface and a right side surface of the left lens 120. The left lens frame 22 may be physically coupled to the support frame 20. Each of the right lens frame 21 and the left lens frame 22 may include a nose support.

Although the support frame 20, the right lens frame 21, and the left lens frame 22 are formed separately and then coupled to each other in FIG. 2, the disclosure is not limited thereto. The support frame 20, the right lens frame 21, and the left lens frame 22 may also be integrally formed.

The first eyeglass temple 31 may be fixed to a left end of a lower side surface of the support frame 20. The second eyeglass temple 32 may be fixed to a right end of the lower side surface of the support frame 20. Each of the first eyeglass temple 31 and the second eyeglass temple 32 may be fixed to the support frame 20 by a fixing member such as a screw.

Each of the support frame 20, the right lens frame 21, the left lens frame 22, the first eyeglass temple 31, and the second eyeglass temple 32 may include plastic, metal, or both plastic and metal. The right lens frame 21 and the left lens frame 22 can be omitted.

Each of the right lens 110 and the left lens 120 may be formed to be transparent or translucent using glass or plastic. Therefore, a user can see an image of reality through the right lens 110 and the left lens 120. The right lens 110 and the left lens 120 may have refractive power in consideration of the user's eyesight.

Each of the right lens 110 and the left lens 120 may be shaped like a rectangular parallelepiped composed of a first surface, a second surface, and first through fourth side surfaces which are quadrangular. However, the disclosure is not limited thereto. Each of the right lens 110 and the left lens 120 may also be shaped like a polyhedron composed of a first surface, a second surface, and side surfaces which are polygonal other than quadrangular. Each of the right lens 110 and the left lens 120 may be shaped like a cylinder, an elliptical cylinder, a semi-cylinder, a semi-elliptical cylinder, a crushed cylinder, or a crushed semi-cylinder other than the polyhedron. The crushed cylinder and the crushed semi-cylinder refer to a cylinder and a semi-cylinder whose diameters are not uniform.

The first surface of the right lens 110 may be a surface facing the user's right eye RE and an exit surface from which light of the first display device 210 is emitted by the right reflectors 410 of the right lens 110. The second surface of the right lens 110 may be an outer surface of the right lens 110.

The first surface of the left lens 120 may be a surface facing the user's left eye LE and an exit surface from which light of the second display device 220 is emitted by the left reflectors 420 of the left lens 120. The second surface of the left lens 120 may be an outer surface of the left lens 120.

Each of the right reflectors 410 and the left reflectors 420 may be a smaller mirror such as a pin mirror. Each of the right reflectors 410 and the left reflectors 420 may be smaller than the pupil of the right eye RE or the left eye LE. For example, a maximum width of each of the right reflectors 410 and the left reflectors 420 may be in a range of tens to hundreds of μm. Since the pupils of the user focus on an image of reality, it is difficult to recognize the right reflectors 410 and the left reflectors 420.

Although each of the right reflectors 410 and the left reflectors 420 has a circular planar shape in FIGS. 1 and 2, the disclosure is not limited thereto. Each of the right reflectors 410 and the left reflectors 420 may also have an elliptical or polygonal planar shape other than the circular planar shape. Although three right reflectors 410 are disposed in the right lens 110 and three left reflectors 420 are disposed in the left lens 120 in FIGS. 1 and 2, the number of right reflectors 410 disposed in the right lens 110 and the number of left reflectors 420 disposed in the left lens 120 are not limited thereto.

The right reflectors 410 may include a first right reflector 411, a second right reflector 412, and a third right reflector 413. The first right reflector 411, the second right reflector 412, and the third right reflector 413 may be disposed in the right lens 110. The first right reflector 411, the second right reflector 412, and the third right reflector 413 may reflect an image displayed on the first display device 210 to the user's right eye RE.

The left reflectors 420 may include a first left reflector 421, a second left reflector 422, and a third left reflector 423. The first left reflector 421, the second left reflector 422, and the third left reflector 423 may be disposed in the left lens 120. The first left reflector 421, the second left reflector 422, and the third left reflector 423 may reflect an image displayed on the second display device 220 to the user's left eye LE.

The first display device 210 may be disposed on the first side surface of the right lens 110, and the second display device 220 may be disposed on the first side surface of the left lens 120. Each of the first display device 210 and the second display device 220 displays a virtual image for realizing augmented reality. The first display device 210 may include a first display panel 211 and a first circuit board 212. The second display device 220 may include a second display panel 221 and a second circuit board 222.

Each of the first display panel 211 and the second display panel 221 may be an organic light emitting display panel or a quantum dot light emitting display panel including quantum dots. Each of the first display panel 211 and the second display panel 221 can be curved or bent due to its flexibility.

The first circuit board 212 may be attached to an end of the first display panel 211. The first display panel 211 may receive digital video data from an external source through the first circuit board 212 and receive power from an external power supply unit. The second circuit board 222 may be attached to an end of the second display panel 221. The second display panel 221 may receive digital video data from the external source through the second circuit board 222 and receive power from the external power supply unit. The first circuit board 212 and the second circuit board 222 may be flexible printed circuit boards and thus may be curved or bent.

The power supply unit for supplying power to the first display device 210 and the second display device 220 may be embedded in any one of the first eyeglass temple 31 and the second eyeglass temple 32. A first cable for connecting the first circuit board 212 to the power supply unit and a second cable for connecting the second circuit board 222 to the power supply unit may be additionally disposed. When the power supply unit is embedded in the second eyeglass temple 32, the first cable may extend to the second eyeglass temple 32. The first cable may be longer than the second cable.

The right condensers 310 may be disposed between the first display device 210 and the first side surface of the right lens 110, and the left condensers 320 may be disposed between the second display device 220 and the first side surface of the left lens 120. The right condensers 310 may include a first right condenser 311, a second right condenser 312, and a third right condenser 313. The left condensers 320 may include a first left condenser 321, a second left condenser 322, and a third left condenser 323.

Each of the right condensers 311 through 313 and the left condensers 321 through 333 may include at least one convex lens. As the number of convex lenses included in each of the right condensers 311 through 313 and the left condensers 321 through 333 increases, the refractive power may increase, thereby increasing a light focusing effect. However, a length of each of the right condensers 311 through 313 and the left condensers 321 through 323 in the third direction (Z-axis direction) may increase.

The right condensers 311 through 313 may include first right convex lenses 311a through 313a and second right convex lenses 311b through 313b, respectively. The second right convex lenses 311b through 313b may be disposed between the first right convex lenses 311a through 313a and the first side surface of the right lens 110.

The first right convex lenses 311a through 313a may be convex toward a direction in which the second right convex lenses 311b through 313b are disposed. For example, the first right convex lenses 311a through 313a may be convex downward. The second right convex lenses 311b through 313b may be convex toward a direction in which the first right convex lenses 311a through 313a are disposed. For example, the second right convex lenses 311b through 313b may be convex upward. However, the convex shape of the first right convex lenses 311a through 313a and the convex shape of the second right convex lenses 311b through 313b are not limited to those illustrated in FIG. 2.

The left condensers 321 through 323 may include first left convex lenses 321a through 323a and second left convex lenses 321b through 323b, respectively. The second left convex lenses 321b through 323b may be disposed between the first left convex lenses 321a through 323a and the first side surface of the left lens 120.

The first left convex lenses 321a through 323a may be convex toward a direction in which the second left convex lenses 321b through 323b are disposed. For example, the first left convex lenses 321a through 323a may be convex downward. The second left convex lenses 321b through 323b may be convex toward a direction in which the first left convex lenses 321a through 323a are disposed. For example, the second left convex lenses 321b through 323b may be convex upward. However, the convex shape of the first left convex lenses 321a through 323a and the convex shape of the second left convex lenses 321b through 323b are not limited to those illustrated in FIG. 2.

Figure 3:
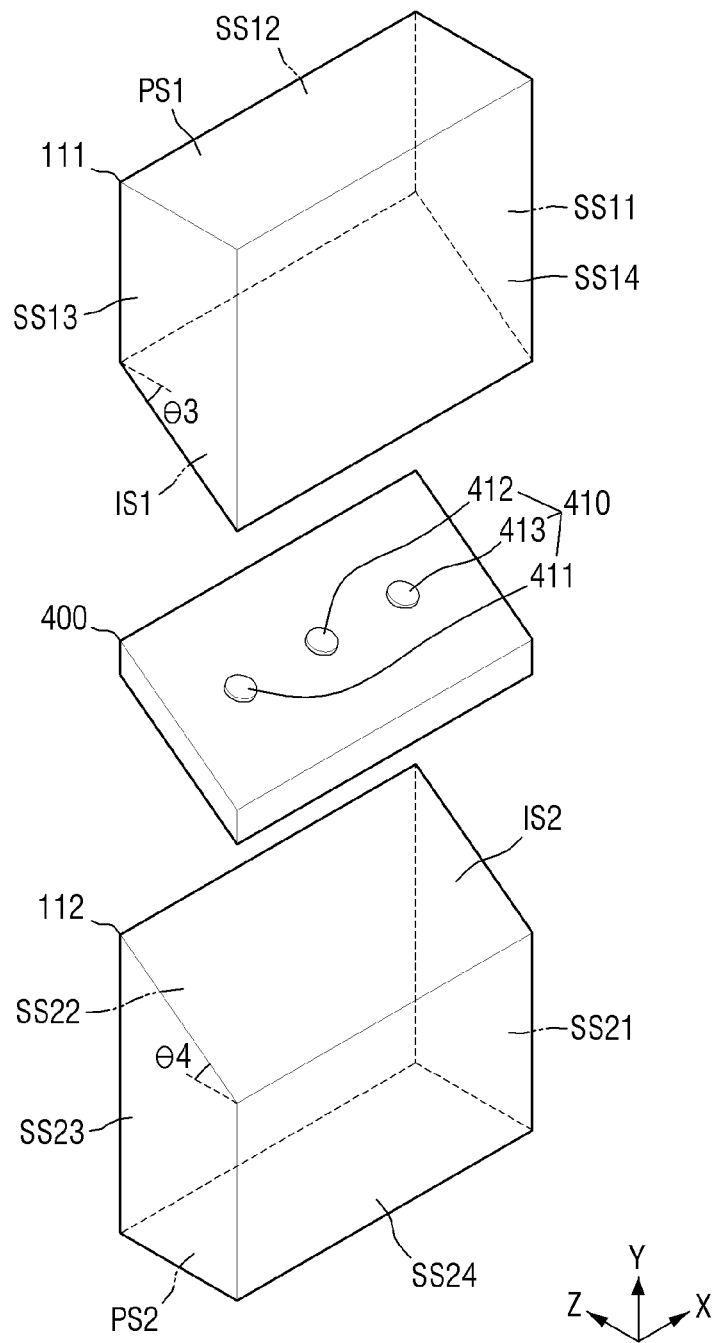
FIG. 3 is an exploded perspective view illustrating an example of a right lens and reflectors of FIG. 2 in detail.
Figure 4:
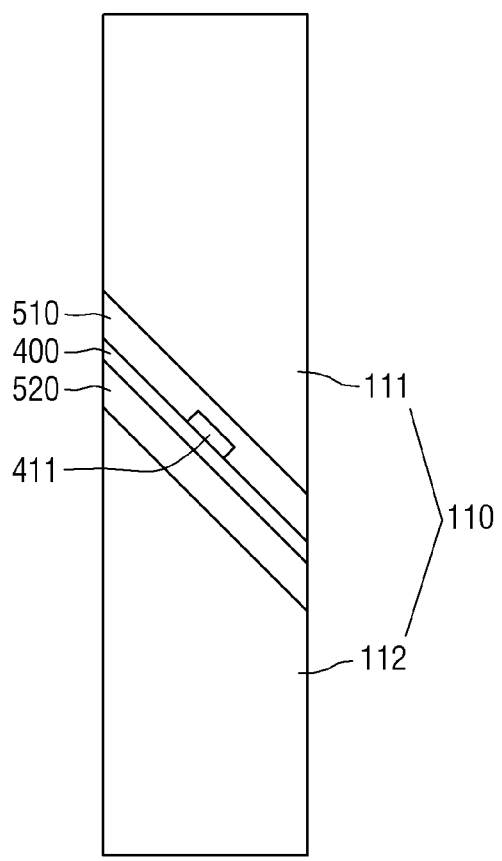
FIG. 4 is a schematic side view illustrating an example of the right lens and the reflectors of FIG. 2 in detail.

FIG. 3 is an exploded perspective view illustrating an example of the right lens 110 and the reflectors 410 of FIG. 2 in detail. FIG. 4 is a schematic side view illustrating an example of the right lens 110 and the reflectors 410 of FIG. 2 in detail. FIG. 4 is a schematic right side view seen from the right side surface of the right lens 110.

Referring to FIGS. 3 and 4, the right lens 110 may include a first lens unit 111, a second lens unit 112, a reflector substrate 400, and the right reflectors 410.

The first lens unit 111 may include a first inclined surface IS1, a first surface PS1, a second side surface SS12 and a fourth side surface SS14 which are rectangular and a first side surface SS11 and a third side surface SS13 which are trapezoidal. The first inclined surface IS1 may be a lower surface of the first lens unit 111, and the first surface PS1 may be an upper surface of the first lens unit 111. The first side surface SS11 of the first lens unit 111 may be a left side surface, the second side surface SS12 may be an upper side surface, the third side surface SS13 may be a right side surface, and the fourth side surface SS14 may be a lower side surface. The first inclined surface IS1, the first surface PS1, the first side surface SS11, the second side surface SS12, the third side surface SS13, and the fourth side surface SS14 of the first lens unit 111 may be flat surfaces.

The second lens unit 112 may include a second inclined surface IS2, a second surface PS2, a second side surface SS22 and a fourth side surface SS24 which are rectangular and a first side surface SS21 and a third side surface S23 which are trapezoidal. The second inclined surface IS2 may be an upper surface of the second lens unit 112, and the second surface PS2 may be a lower surface of the second lens unit 112. The first side surface SS21 of the second lens unit 112 may be a left side surface, the second side surface SS22 may be an upper side surface, the third side surface SS23 may be a right side surface, and the fourth side surface SS24 may be a lower side surface. The second inclined surface IS2, the second surface PS2, the first side surface SS21, the second side surface SS22, the third side surface SS23, and the fourth side surface SS24 of the second lens unit 112 may be flat surfaces.

The first inclined surface IS1 of the first lens unit 111 may be disposed to face the second inclined surface IS2 of the second lens unit 112. An angle $\theta 3$ at which the first inclined surface IS1 is inclined to the second side surface SS12 of the first lens unit 111 may be substantially equal to an angle $\theta 4$ at which the second inclined surface IS2 is inclined to the fourth side surface SS24 of the second lens unit 112. The first inclined surface IS1 of the first lens unit 111 may be disposed parallel to the second inclined surface IS2 of the second lens unit 112.

The reflector substrate 400 may be disposed between the first inclined surface IS1 of the first lens unit 111 and the second inclined surface IS2 of the second lens unit 112. The reflector substrate 400 may be formed to be transparent or translucent using glass or plastic. For example, the reflector substrate 400 may be formed using ultra-thin glass having a thickness of about 0.1 mm or less or may be formed using a flexible film such as a polyimide film.

The right reflectors 410 may be disposed on a first surface of the reflector substrate 400. The first surface of the reflector substrate 400 may be a surface facing the first inclined surface IS1 of the first lens unit 111. A second surface opposite the first surface of the reflector substrate 400 may be a surface facing the second inclined surface IS2 of the second lens unit 112.

Each of the right reflectors 410 may be formed by depositing a metal having high reflectivity, such as silver (Ag), on the first surface of the reflector substrate 400. Each of the right reflectors 410 may be formed to have a small thickness in a range of several to tens of μm. The first right reflector 411, the second right reflector 412, and the third right reflector 413 may be disposed in the first direction (X-axis direction).

A first adhesive layer 510 is disposed between the first inclined surface IS1 of the first lens unit 111 and the first surface of the reflector substrate 400 and bonds the first surface of the reflector substrate 400 to the first inclined surface IS1 of the first lens unit 111. A second adhesive layer 520 is disposed between the second inclined surface IS2 of the second lens unit 112 and the second surface of the reflector substrate 400 and bonds the second surface of the reflector substrate 400 to the second inclined surface IS2 of the second lens unit 112. Each of the first adhesive layer 510 and the second adhesive layer 520 may be an optically clear resin (OCR) or an optically clear adhesive (OCA).

A refractive index of the first lens unit 111 may be substantially equal to a refractive index of the second lens unit 112. In order to minimize the effect of the first adhesive layer 510 and the second adhesive layer 520 on light of the first display device 210 provided to the right lens 110 due to refraction and reflection, a refractive index of each of the first adhesive layer 510 and the second adhesive layer 520 may be designed to match the refractive index of the first lens unit 111 and the refractive index of the second lens unit 112. Each of the refractive index of the first adhesive layer 510 and the refractive index of the second adhesive layer 520 may be substantially equal to the refractive index of the first lens unit 111 and the refractive index of the second lens unit 112. A difference between the refractive index of the first adhesive layer 510 and the refractive index of the first lens unit 111, a difference between the refractive index of the first adhesive layer 510 and the refractive index of the second lens unit 112, a difference between the refractive index of the second adhesive layer 520 and the refractive index of the first lens unit 111, and a difference between the refractive index of the second adhesive layer 520 and the refractive index of the second lens unit 112 may be about 0.1 or less.

According to the embodiment illustrated in FIGS. 3 and 4, the reflector substrate 400 on which the right reflectors 410 are disposed is bonded to the first inclined surface IS1 of the first lens unit 111 of the right lens 110 by using the first adhesive layer 510 and is bonded to the second inclined surface IS2 of the second lens unit 112 of the right lens 110 by using the second adhesive layer 520. Therefore, it is possible to easily manufacture the right lens 110 including the right reflectors 410 inclined in the height direction (Y-axis direction) at the third angle θ3 with respect to the thickness direction (Z-axis direction) of the right lens 110.

The left lens 120 is substantially the same as the right lens 110 described above with reference to FIGS. 3 and 4, and thus a description of the left lens 120 is omitted.

Figure 5:
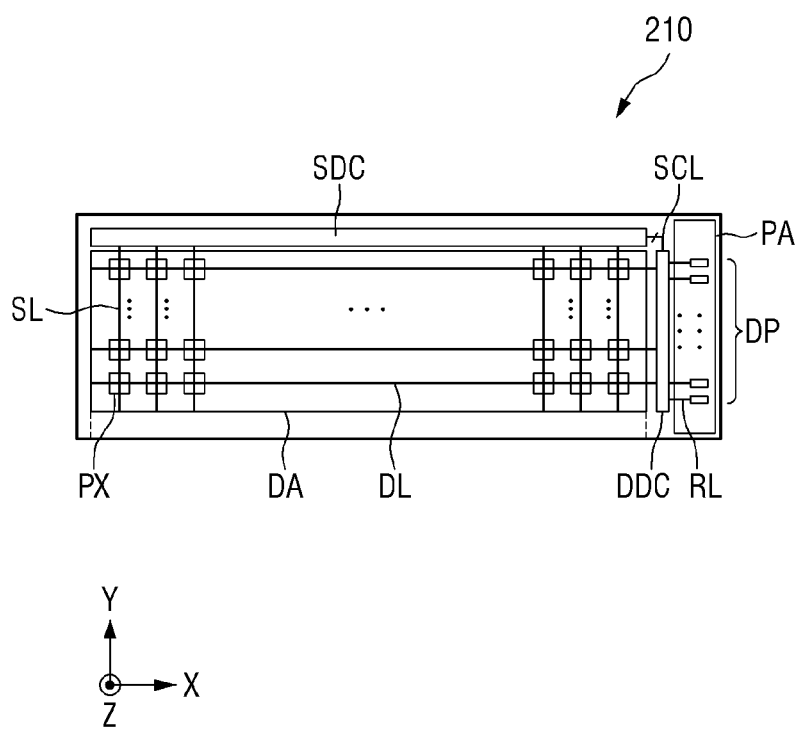
FIG. 5 is a schematic layout view of an example of a first display device of FIG. 2.

FIG. 5 is a schematic layout view of an example of the first display device 210 of FIG. 2.

Referring to FIG. 5, the first display panel 211 of the first display device 210 may include a display area DA, a pad area PA, a scan driving circuit unit SDC, and an integrated driving circuit unit DDC.

The display area DA may include data lines DL, scan lines SL, and pixels PX. As illustrated in FIG. 5, the data lines DL may extend in the width direction (X-axis direction) of the right lens 110, and the scan lines SL may extend in the thickness direction (Y-axis direction) of the right lens 110. The pixels PX may be disposed in areas defined by the data lines DL and the scan lines SL. For example, the pixels PX may be disposed at intersections of the data lines DL and the scan lines SL. The pixels PX of the display area DA will be described in detail later with reference to FIG. 6.

The pad area PA includes routing lines RL connected to the integrated driving circuit unit DDC and pads DP connected to the routing lines RL. The pads DP may be electrically connected to the first circuit board 212. The first circuit board 212 may be attached onto the pads DP using an anisotropic conductive film.

The scan driving circuit unit SDC may be disposed on a first side of the display area DA. The scan driving circuit unit SDC may be disposed adjacent to a long side of the display area DA. The scan driving circuit unit SDC is connected to the scan lines SL of the display area DA. The scan driving circuit unit SDC may receive a scan control signal SCL from the integrated driving circuit unit DDC, generate scan signals according to the scan control signal SCL, and sequentially transmit the scan signals to the scan lines SL.

The scan driving circuit unit SDC may include thin-film transistors as switch elements. The thin-film transistors of the scan driving circuit unit SDC may be formed at the same time as thin-film transistors of the pixels PX of the display area DA.

The integrated driving circuit unit DDC may be disposed on a second side of the display area DA. The integrated driving circuit unit DDC may be disposed adjacent to a short side of the display area DA. The integrated driving circuit unit DDC may be disposed in the pad area PA. In an embodiment, the integrated driving circuit unit DDC may be disposed on the first circuit board 212. The integrated driving circuit unit DDC may be formed as an integrated circuit.

The integrated driving circuit unit DDC receives timing signals and video data through the routing lines RL. The integrated driving circuit unit DDC may generate a scan control signal SCL from the timing signals and output the scan control signal SCL to the scan driving circuit unit SDC. The integrated driving circuit unit DDC may generate a data control signal from the timing signals. The integrated driving circuit unit DDC may generate data voltages and apply the data voltages to the data lines DL during a period in which scan signals are transmitted according to the data control signal and the video data.

The second display device 220 may be substantially the same as the first display device 210 described above with reference to FIG. 5, and thus a description of the second display device 220 is omitted.

Figure 6:
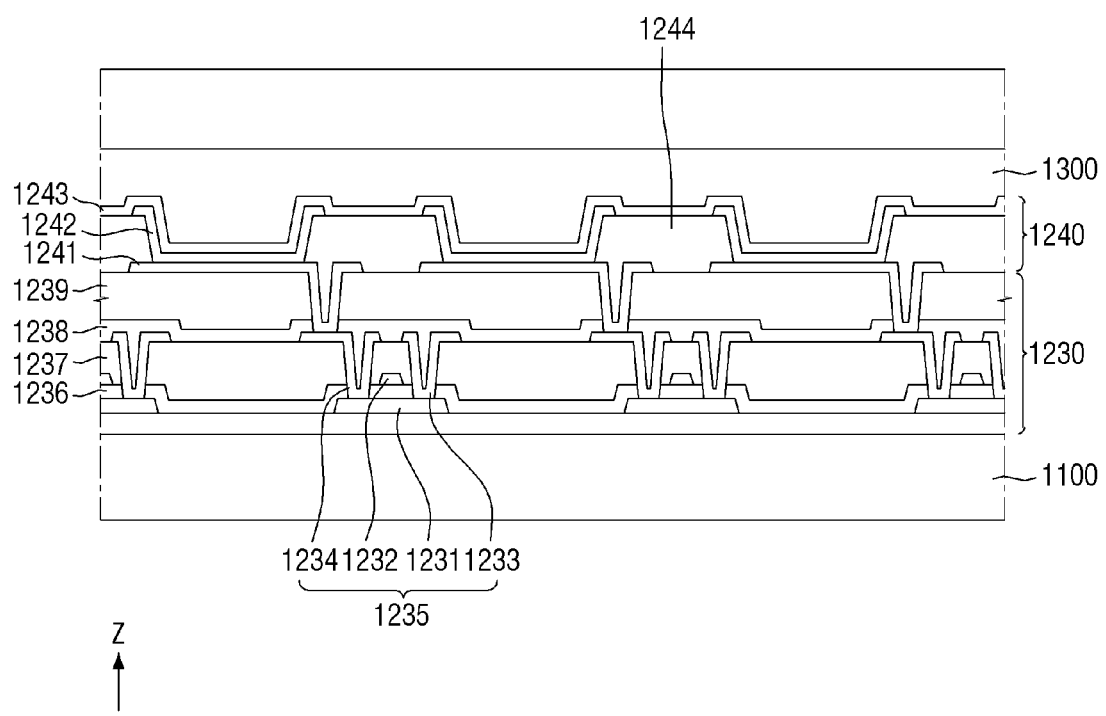
FIG. 6 is a partial schematic cross-sectional view of a first display area of the first display device of FIG. 5.

FIG. 6 is a schematic partial cross-sectional view of the display area DA of the first display device 210 of FIG. 5.

Referring to FIG. 6, the display area DA of the first display device 210 may include a substrate 1100, a thin-film transistor layer 1230, a light emitting element layer 1240, and a thin-film encapsulation layer 1300.

The thin-film transistor layer 1230 is formed on the substrate 1100. The thin-film transistor layer 1230 includes thin-film transistors 1235, a gate insulating layer 1236, an interlayer insulating film 1237, a protective layer 1238, and a planarization layer 1239.

A buffer layer may be formed on the substrate 1100. The buffer layer may be formed on the substrate 1100 to protect the thin-film transistors 1235 and light emitting elements from moisture introduced through the substrate 1100 which is vulnerable to moisture penetration. The buffer layer may be composed of inorganic layers stacked alternately. For example, the buffer layer may be a multilayer in which one or more inorganic layers selected from a silicon oxide (SiOx) layer, a silicon nitride (SiNx) layer, and SiON are alternately stacked. The buffer layer can be omitted.

The thin-film transistors 1235 may be formed on the buffer layer. Each of the thin-film transistors 1235 includes an active layer 1231, a gate electrode 1232, a source electrode 1233, and a drain electrode 1234. In FIG. 6, each of the thin-film transistors 1235 is formed as a top-gate type in which the gate electrode 1232 is located above the active layer 1231. However, it should be noted that the disclosure is not limited thereto. For example, each of the thin-film transistors 1235 may also be formed as a bottom-gate type in which the gate electrode 1232 is located under the active layer 1231 or a double-gate type in which the gate electrode 1232 is located both above and under the active layer 1231.

The active layers 1231 may be formed on the buffer layer. The active layers 1231 may be made of a silicon-based semiconductor material or an oxide-based semiconductor material. A light shielding layer may be formed between the buffer layer and the active layers 1231 to block external light from entering the active layers 1231.

The gate insulating layer 1236 may be formed on the active layers 1231. The gate insulating layer 1236 may be an inorganic layer, for example, a silicon oxide (SiOx) layer, a silicon nitride (SiNx) layer, or a multilayer composed of these layers.

The gate electrodes 1232 and gate lines may be formed on the gate insulating layer 1236. Each of the gate electrodes 1232 and the gate lines may be a single layer or a multilayer made of any one or more of molybdenum (Mo), aluminum (Al), chromium (Cr), gold (Au), titanium (Ti), nickel (Ni), neodymium (Ne), copper (Cu), and alloys of the same.

The interlayer insulating film 1237 may be formed on the gate electrodes 1232 and the gate lines. The interlayer insulating film 1237 may be an inorganic layer, for example, a silicon oxide (SiOx) layer, a silicon nitride (SiNx) layer, or a multilayer composed of these layers.

The source electrodes 1233, the drain electrodes 1234, and data lines may be formed on the interlayer insulating film 1237. Each of the source electrodes 1233 and the drain electrodes 1234 may be connected to an active layer 1231 through a contact hole penetrating the gate insulating layer 1236 and the interlayer insulating film 1237. Each of the source electrodes 1233, the drain electrodes 1234 and the data lines may be a single layer or a multilayer made of any one or more of molybdenum (Mo), aluminum (Al), chromium (Cr), gold (Au), titanium (Ti), nickel (Ni), neodymium (Ne), copper (Cu), and alloys of the same.

The protective layer 1238 for insulating the thin-film transistors 1235 may be formed on the source electrodes 1233, the drain electrodes 1234, and the data lines. The protective layer 1238 may be an inorganic layer, for example, a silicon oxide (SiOx) layer, a silicon nitride (SiNx) layer, or a multilayer composed of these layers.

The planarization layer 1239 may be formed on the protective layer 1238 to flatten steps due to the thin-film transistors 1235. The planarization layer 1239 may be made of an organic layer such as acryl resin, epoxy resin, phenolic resin, polyamide resin, or polyimide resin.

The light emitting element layer 1240 is formed on the thin-film transistor layer 1230. The light emitting element layer 1240 includes the light emitting elements and a pixel defining layer 1244.

The light emitting elements and the pixel defining layer 1244 may be formed on the planarization layer 1239. The light emitting elements may be organic light emitting devices. Each of the light emitting elements may include an anode 1241, a light emitting layer 1242, and a cathode 1243.

The anodes 1241 may be formed on the planarization layer 1239. The anodes 1241 may be connected to the drain electrodes 1234 of the thin-film transistors 1235 through contact holes penetrating the protective layer 1238 and the planarization layer 1239.

The pixel defining layer 1244 may be formed on the planarization layer 1239 to cover edges of the anodes 1241 so as to define pixels PX. For example, the pixel defining layer 1244 may serve as a pixel defining layer for defining the pixels PX. Each of the pixels PX is an area in which the anode 1241, the light emitting layer 1242 and the cathode 1243 are sequentially stacked so that holes from the anode 1241 and electrons from the cathode 1243 combine together in the light emitting layer 1242 to emit light.

The light emitting layers 1242 are formed on the anodes 1241 and the pixel defining layer 1244. The light emitting layers 1242 may be organic light emitting layers. Each of the light emitting layers 1242 may emit one of red light, green light, and blue light. The red light may have a peak wavelength in a range of about 620 nm to about 750 nm, and the green light may have a peak wavelength in a range of about 495 nm to about 570 nm. The blue light may have a peak wavelength in a range of about 450 nm to about 495 nm. In an embodiment, each of the light emitting layers 1242 may be a white light emitting layer that emits white light. Each of the light emitting layers 1242 may be a stack of the red light emitting layer, the green light emitting layer, and the blue light emitting layer and may be a common layer common to the pixels PX. The first display device 210 may further include separate color filters for displaying red, green, and blue.

Each of the light emitting layers 1242 may include a hole transporting layer, a light emitting layer, and an electron transporting layer. Each of the light emitting layers 1242 may be formed in a tandem structure of two or more stacks. A charge generating layer may be formed between the stacks.

The cathode 1243 is formed on the light emitting layers 1242. The cathode 1243 may be formed to cover the light emitting layers 1242. The cathode 1243 may be a common layer common to the pixels PX.

When the light emitting element layer 1240 is formed as a top emission type which emits light in an upward direction, the anodes 1241 may be made of a metal material having high reflectivity, such as a stacked structure (Ti/Al/Ti) of aluminum and titanium, a stacked structure (ITO/Al/ITO) of aluminum and indium tin oxide, an APC alloy, or a stacked structure (ITO/APC/ITO) of an APC alloy and indium tin oxide. The APC alloy is an alloy of silver (Ag), palladium (Pd), and copper (Cu). The cathode 1243 may be made of a transparent conductive material (TCO) capable of transmitting light, such as indium tin oxide (ITO) or indium zinc oxide (IZO), or a semi-transmissive conductive material such as magnesium (Mg), silver (Ag) or an alloy of Mg and Ag. When the cathode 1243 is made of a semi-transmissive conductive material, light output efficiency may be increased by a microcavity.

When the light emitting element layer 1240 is formed as a bottom emission type which emits light in a downward direction, the anodes 1241 may be made of a transparent conductive material (TCO) such as indium tin oxide (ITO) or indium zinc oxide (IZO) or a semi-transmissive conductive material such as magnesium (Mg), silver (Ag) or an alloy of Mg and Ag. The cathode 1243 may be made of a metal material having high reflectivity, such as a stacked structure (Ti/Al/Ti) of aluminum and titanium, a stacked structure (ITO/Al/ITO) of aluminum and indium tin oxide, an APC alloy, or a stacked structure (ITO/APC/ITO) of an APC alloy and indium tin oxide. When the anodes 1241 are made of a semi-transmissive conductive material, the light output efficiency may be increased by a microcavity.

The thin-film encapsulation layer 1300 may be formed on the light emitting element layer 1240. The thin-film encapsulation layer 1300 serves to prevent oxygen or moisture from permeating into the light emitting layers 1242 and the cathode 1243. To this end, the thin-film encapsulation layer 1300 may include at least one inorganic layer. The inorganic layer may be made of silicon nitride, aluminum nitride, zirconium nitride, titanium nitride, hafnium nitride, tantalum nitride, silicon oxide, aluminum oxide, or titanium oxide. The thin-film encapsulation layer 1300 may further include at least one organic layer. The organic layer may be formed to a sufficient thickness to prevent particles from penetrating the thin-film encapsulation layer 1300 and entering the light emitting layers 1242 and the cathode 1243. The organic layer may include any one of epoxy, acrylate, and urethane acrylate. An encapsulation substrate instead of the thin-film encapsulation layer 1300 may also be disposed on the light emitting element layer 1240.

A display area of the second display device 220 may be substantially the same as the display area DA of the first display device 210 described above with reference to FIG. 6, and thus a description of the display area of the second display device 220 is omitted.

Figure 7:
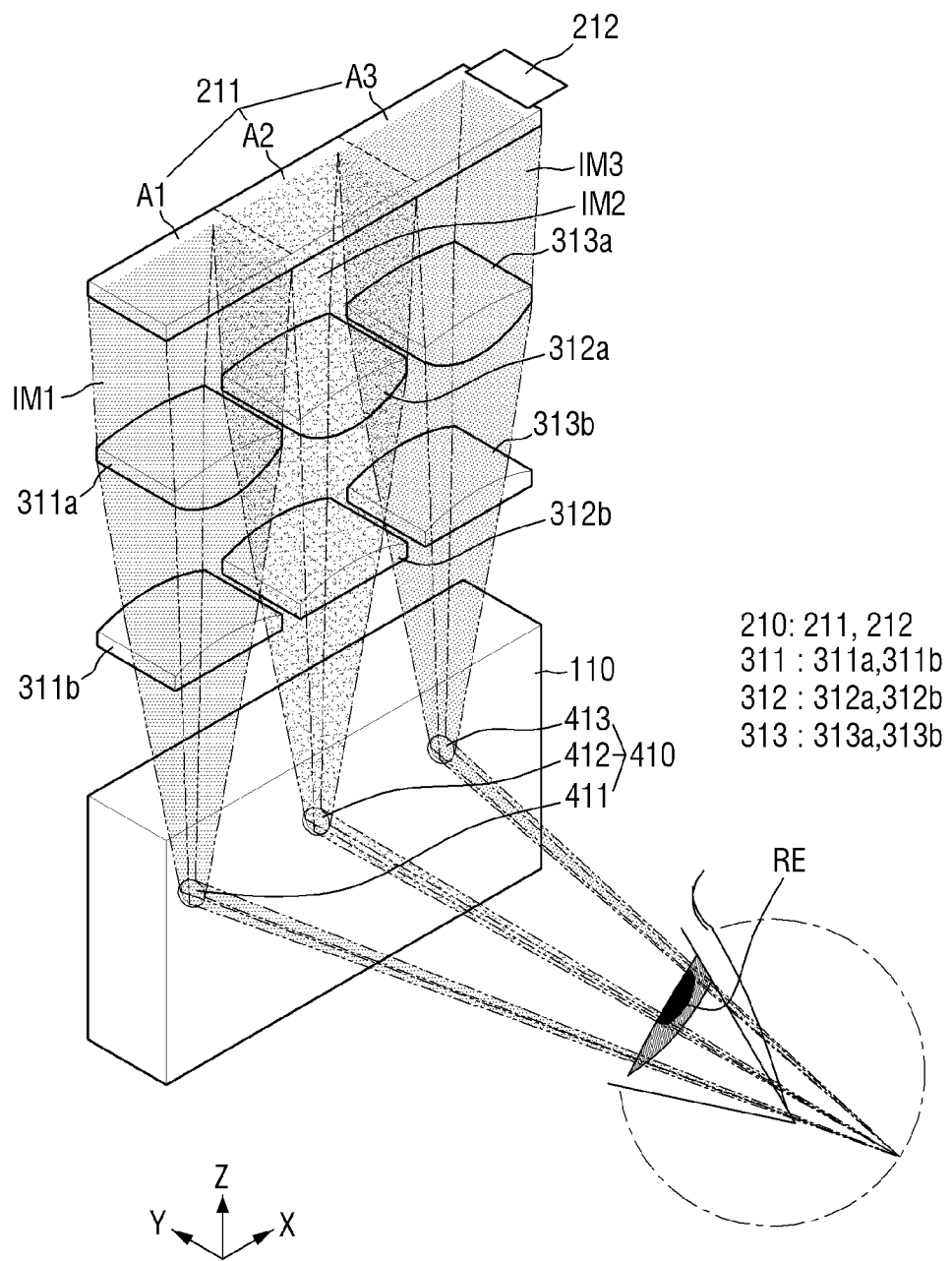
FIGS. 7 through 9 are views for explaining an augmented reality providing method of the optical device according to an embodiment of FIG. 2.
Figure 8:
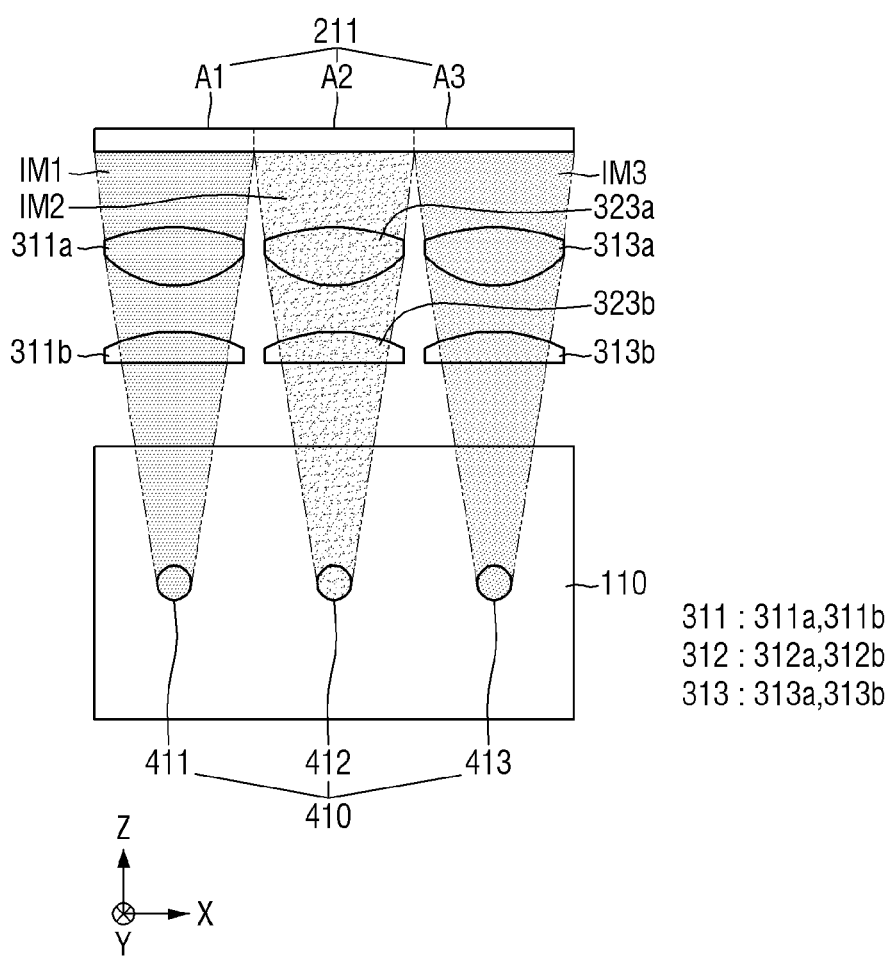
Figure 9:
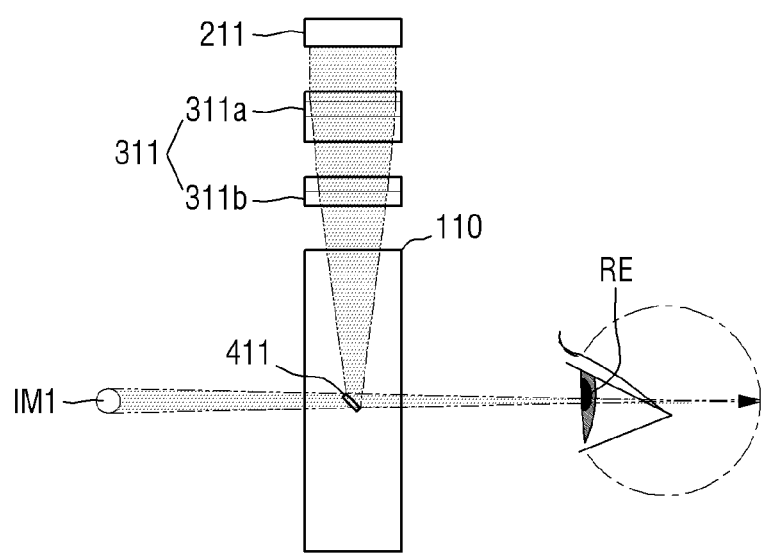

FIGS. 7 through 9 are views for explaining an augmented reality providing method of the optical device according to an embodiment of FIG. 2.

FIG. 7 is a perspective view illustrating the right lens 110, the first display device 210, the right condensers 311 through 313, and the right reflectors 410. FIG. 8 is a plan view seen from the first surface of the right lens 110. FIG. 9 is a right side view seen from the right side surface of the right lens 110.

Referring to FIGS. 7 through 9, the display area DA of the first display panel 211 may include areas displaying images. For example, the first display panel 211 may include a first area A1 displaying a first image IM1, a second area A2 displaying a second image IM2, and a third area A3 displaying a third image IM3.

The first area A1, the second area A2, and the third area A3 of the first display panel 211 may be disposed in the first direction (X-axis direction). The first area A1 and the second area A2 of the first display panel 211 may contact each other, and the second area A2 and the third area A3 may contact each other. A space not displaying an image may be disposed between the first area A1 and the second area A2 of the first display panel 211, and a space not displaying an image may be disposed between the second area A2 and the third area A3.

The first right condenser 311, the second right condenser 312, and the third right condenser 313 may be disposed in the first direction (X-axis direction). The first right reflector 411, the second right reflector 412, and the third right reflector 413 may be disposed in the first direction (X-axis direction).

The first area A1, the first right condenser 311 and the first right reflector 411 of the first display panel 211 may overlap each other in the third direction (Z-axis direction). The second area A2, the second right condenser 312 and the second right reflector 412 of the first display panel 211 may overlap each other in the third direction (Z-axis direction). The third area A3, the third right condenser 313 and the third right reflector 413 of the first display panel 211 may overlap each other in the third direction (Z-axis direction).

The images IM1 through IM3 displayed on the areas A1 through A3 of the first display panel 211 may be focused on the right reflectors 411 through 413 by the right condensers 311 through 313, respectively. Therefore, the images IM1 through IM3 displayed on the areas A1 through A3 of the first display panel 211 may be reflected respectively by the right reflectors 411 through 413 to a user's right eye RE.

The first image IM1 displayed on the first area A1 of the first display panel 211 may be focused on the first right reflector 411 by the first convex lens 311a and the second convex lens 311b of the first right condenser 311. The first right reflector 411 may reflect the first image IM1 incident from the first side surface of the right lens 110 to the first surface of the right lens 110. Therefore, the first image IM1 may be formed on the retina of the user's right eye RE.

The second image IM2 displayed on the second area A2 of the first display panel 211 may be focused on the second right reflector 412 by the first convex lens 312a and the second convex lens 312b of the second right condenser 312. The second right reflector 412 may reflect the second image IM2 incident from the first side surface of the right lens 110 to the first surface of the right lens 110. Therefore, the second image IM2 may be formed on the retina of the user's right eye RE.

The third image IM3 displayed on the third area A3 of the first display panel 211 may be focused on the third right reflector 413 by the first convex lens 313a and the second convex lens 313b of the third right condenser 313. The third right reflector 413 may reflect the third image IM3 incident from the first side surface of the right lens 110 to the first surface of the right lens 110. Therefore, the third image IM3 may be formed on the retina of the user's right eye RE.

As illustrated in FIGS. 7 through 9, the first image IM1, the second image IM2, and the third image IM3 displayed on the first area A1, the second area A2, and the third area A3 of the first display panel 211 may be formed on the retina of the user's right eye RE by the first right reflector 411, the second right reflector 412, and the third right reflector 413, respectively. Therefore, the user may see one image, into which the first image IM1, the second image IM2, and the third image IM3 are combined, through the right eye RE. Since the user can see an image into which the first image IM1, the second image IM2, and the third image IM3 are combined together with an image of reality without moving the focus on the image of reality, augmented reality can be provided to the user.

When the first display panel 211 includes areas A1 through A3, the right condensers 311 through 313 may focus the images IM1 through IM3 of the areas A1 through A3 of the first display panel 211 on the right reflectors 411 through 413, respectively. When the first display panel 211 does not include areas A1 through A3, a right condenser has to focus an image of the first display panel 211 on all of the right reflectors 411 through 413. Therefore, refractive power of each of the right condensers 311 through 313 when the first display panel 211 includes areas A1 through A3 may be smaller than refractive power of the right condenser when the first display panel 211 does not include areas A1 through A3. Accordingly, a thickness of each of the right condensers 311 through 313 when the first display panel 211 includes areas A1 through A3 may be smaller than a thickness of the right condenser when the first display panel 211 does not include areas A1 through A3. Therefore, the size of the optical device 1 can be reduced.

When the first display panel 211 does not include areas A1 through A3, an image not proceeding to the right reflectors 411 through 413 among images of the first display panel 211 may be lost. For example, among the images of the first display panel 211, images proceeding to a space between the first right reflector 411 and the second right reflector 412 and to a space between the second right reflector 412 and the third right reflector 413 may be lost. However, when the first display panel 211 includes areas A1 through A3, since the images IM1 through IM3 of the areas A1 through A3 of the first display panel 211 are focused on the right reflectors 411 through 413, respectively, images not proceeding to the right reflectors 411 through 413 can be reduced. Therefore, a luminance loss of an image provided by the optical device 1 can be reduced.

An augmented reality providing method using the left lens 120, the second display device 220, the left condensers 320, and the left reflectors 420 is substantially the same as that described above with reference to FIGS. 7 through 9, and thus a description thereof is omitted.

Figure 10:
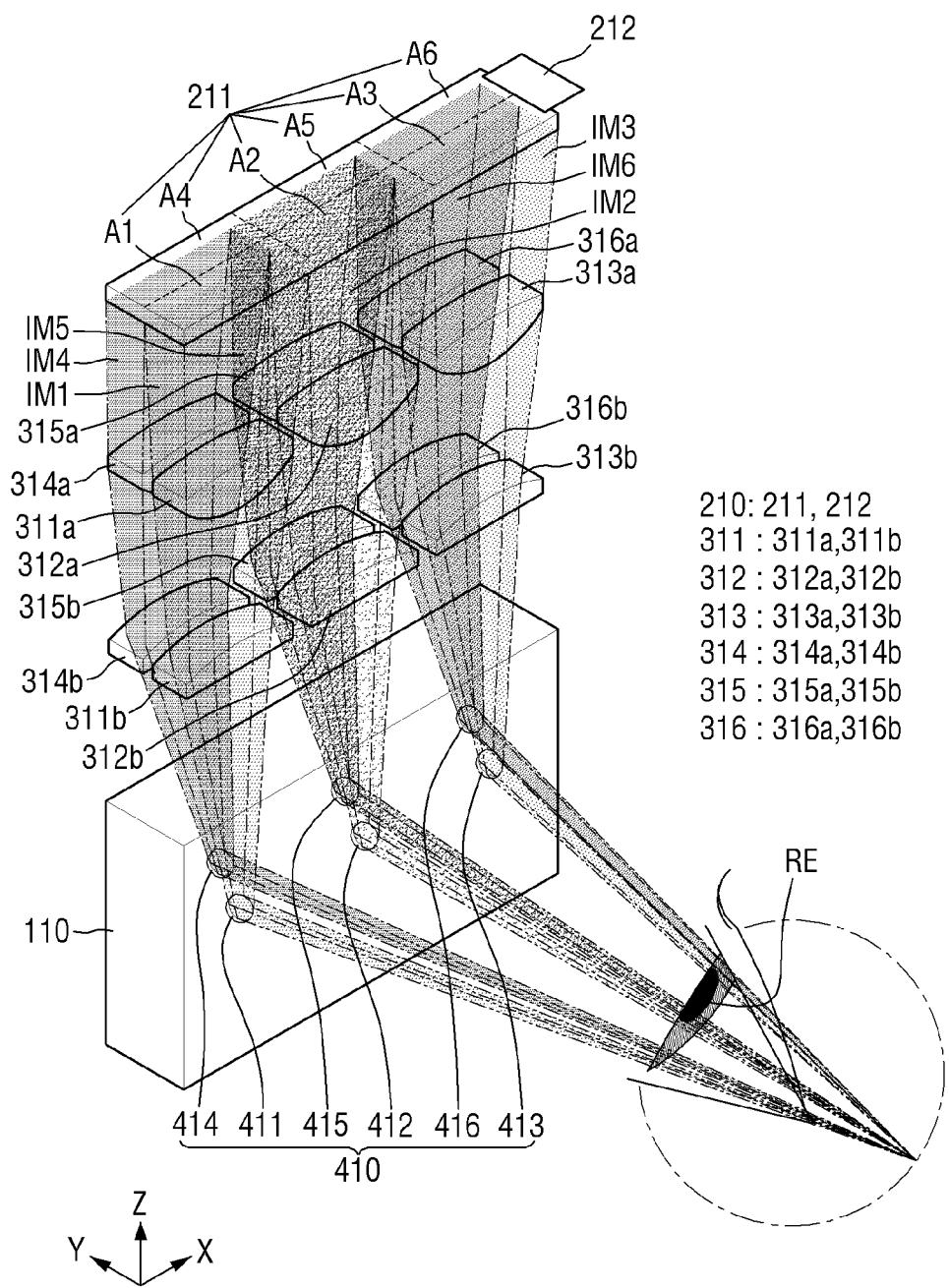
FIGS. 10 through 12 are views for explaining an augmented reality providing method of an optical device according to another embodiment of FIG. 2.
Figure 11:
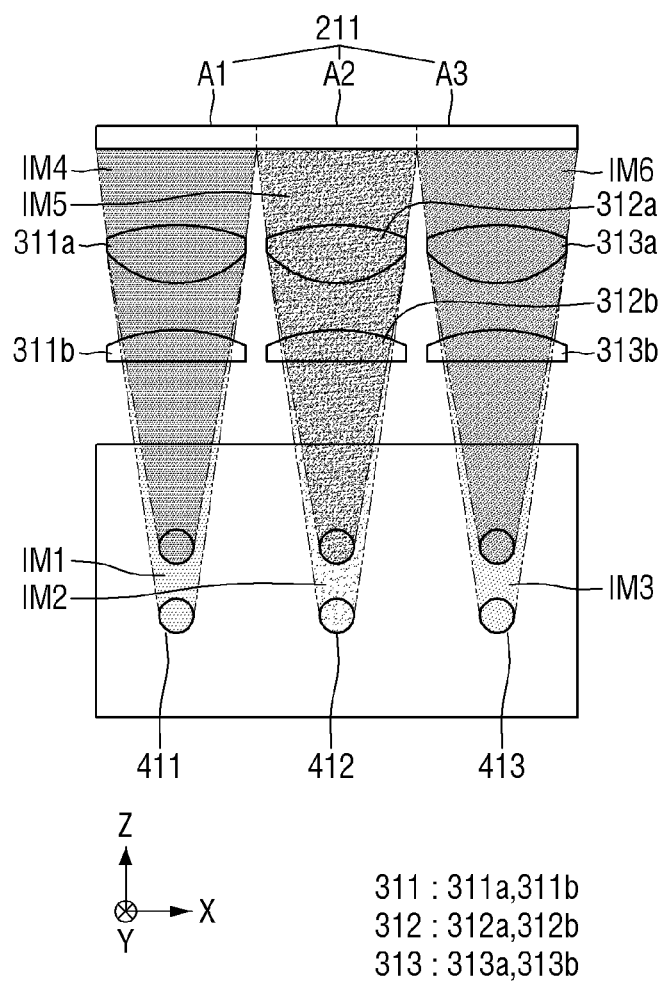
Figure 12:
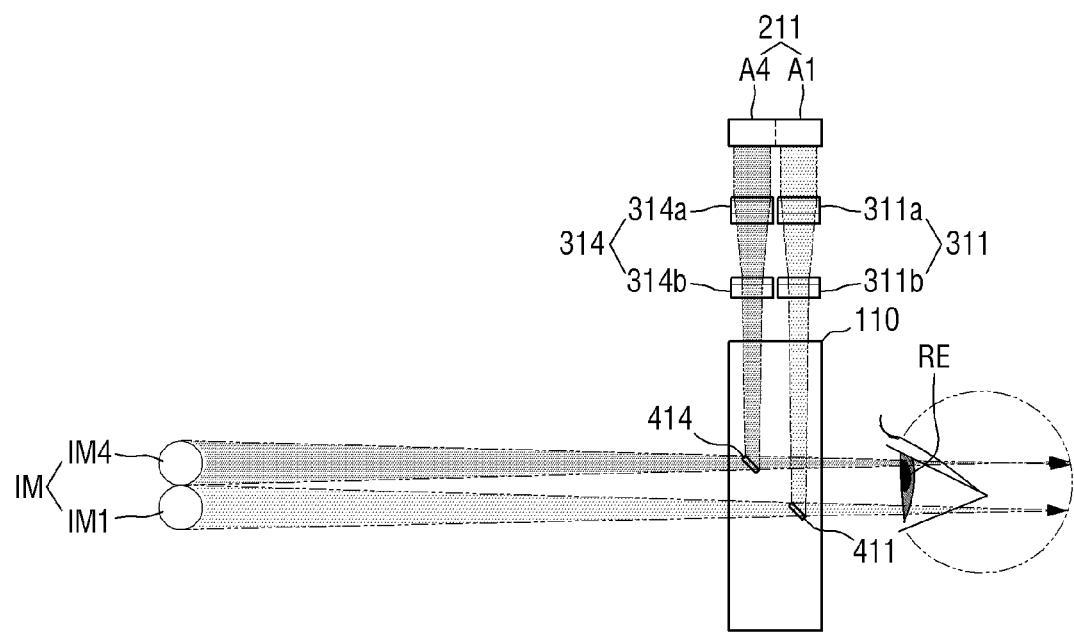

FIGS. 10 through 12 are views for explaining an augmented reality providing method of an optical device according to another embodiment of FIG. 2.

FIG. 10 is a perspective view illustrating a right lens 110, a first display device 210, right condensers 311 through 316, and right reflectors 410. FIG. 11 is a plan view seen from a first surface of the right lens 110. FIG. 12 is a right side view seen from a right side surface of the right lens 110.

The embodiment of FIGS. 10 through 12 is different from the embodiment of FIGS. 7 through 9 in that a display area DA of a first display panel 211 includes six areas A1 through A6, and the optical device 1 includes six right condensers 311 through 316 and six right reflectors 411 through 416.

Referring to FIGS. 10 through 12, the first display panel 211 may include a first area A1 displaying a first image IM1, a second area A2 displaying a second image IM2, a third area A3 displaying a third image IM3, a fourth area A4 displaying a fourth image IM4, a fifth area A5 displaying a fifth image IM5, and a sixth area A6 displaying a sixth image IM6.

The first area A1, the second area A2, and the third area A3 of the first display panel 211 may be disposed in the first direction (X-axis direction). The fourth area A4, the fifth area A5, and the sixth area A6 of the first display panel 211 may be disposed in the first direction (X-axis direction).

The first area A1 and the fourth area A4 of the first display panel 211 may be disposed in the second direction (Y-axis direction). The second area A2 and the fifth area A5 of the first display panel 211 may be disposed in the second direction (Y-axis direction). The third area A3 and the sixth area A6 of the first display panel 211 may be disposed in the second direction (Y-axis direction).

Areas adjacent to each other in the first direction (X-axis direction) among the areas of the first display panel 211 may contact each other. In an embodiment, a space not displaying an image may be disposed between areas adjacent to each other in the first direction (X-axis direction) among the areas of the first display panel 211.

Areas adjacent to each other in the second direction (Y-axis direction) among the areas of the first display panel 211 may contact each other. In an embodiment, a space not displaying an image may be disposed between areas adjacent to each other in the second direction (Y-axis direction) among the areas of the first display panel 211.

A first right condenser 311, a second right condenser 312, and a third right condenser 313 may be disposed in the first direction (X-axis direction). A fourth right condenser 314, a fifth right condenser 315, and a sixth right condenser 316 may be disposed in the first direction (X-axis direction).

The first condenser 311 and the fourth right condenser 314 may be disposed in the second direction (Y-axis direction). The second right condenser 312 and the fifth right condenser 315 may be disposed in the second direction (Y-axis direction). The third right condenser 313 and the sixth right condenser 316 may be disposed in the second direction (Y-axis direction).

The first right condenser 311 may be disposed between the first area A1 of the first display panel 211 and a first side surface of the right lens 110. The second right condenser 312 may be disposed between the second area A2 of the first display panel 211 and the first side surface of the right lens 110. The third right condenser 313 may be disposed between the third area A3 of the first display panel 211 and the first side surface of the right lens 110. The fourth right condenser 314 may be disposed between the fourth area A4 of the first display panel 211 and the first side surface of the right lens 110. The fifth right condenser 315 may be disposed between the fifth area A5 of the first display panel 211 and the first side surface of the right lens 110. The sixth right condenser 316 may be disposed between the sixth area A6 of the first display panel 211 and the first side surface of the right lens 110.

A first right reflector 411, a second right reflector 412, and a third right reflector 413 may be disposed in the first direction (X-axis direction). A fourth right reflector 414, a fifth right reflector 415, and a sixth right reflector 416 may be disposed in the first direction (X-axis direction).

The first right reflector 411 and the fourth right reflector 414 may be disposed in the second direction (Y-axis direction). The second right reflector 412 and the fifth right reflector 415 may be disposed in the second direction (Y-axis direction). The third right reflector 413 and the sixth right reflector 416 may be disposed in the second direction (Y-axis direction).

The images IM1 through IM6 displayed on the areas A1 through A6 of the first display panel 211 may be focused on the right reflectors 411 through 416 by the right condensers 311 through 316, respectively. Therefore, the images IM2 through IM6 displayed on the areas A1 through A6 of the first display panel 211 may be reflected respectively by the right reflectors 411 through 416 to a user's right eye RE.

The first image IM1 displayed on the first area A1 of the first display device 210 may be focused on the first right reflector 411 by a first convex lens 311a and a second convex lens 311b of the first right condenser 311. The first right reflector 411 may reflect the first image IM1 incident from the first side surface of the right lens 110 to the first surface of the right lens 110. Therefore, the first image IM1 may be formed on the retina of the user's right eye RE.

The second image IM2 displayed on the second area A2 of the first display device 210 may be focused on the second right reflector 412 by a first convex lens 312a and a second convex lens 312b of the second right condenser 312. The second right reflector 412 may reflect the second image IM2 incident from the first side surface of the right lens 110 to the first surface of the right lens 110. Therefore, the second image IM2 may be formed on the retina of the user's right eye RE.

The third image IM3 displayed on the third area A3 of the first display device 210 may be focused on the third right reflector 413 by a first convex lens 313a and a second convex lens 313b of the third right condenser 313. The third right reflector 413 may reflect the third image IM3 incident from the first side surface of the right lens 110 to the first surface of the right lens 110. Therefore, the third image IM3 may be formed on the retina of the user's right eye RE.

The fourth image IM4 displayed on the fourth area A4 of the first display device 210 may be focused on the fourth right reflector 414 by a first convex lens 314a and a second convex lens 314b of the fourth right condenser 314. The fourth right reflector 414 may reflect the fourth image IM4 incident from the first side surface of the right lens 110 to the first surface of the right lens 110. Therefore, the fourth image IM4 may be formed on the retina of the user's right eye RE.

The fifth image IM5 displayed on the fifth area A5 of the first display device 210 may be focused on the fifth right reflector 415 by a first convex lens 315a and a second convex lens 315b of the fifth right condenser 315. The fifth right reflector 415 may reflect the fifth image IM5 incident from the first side surface of the right lens 110 to the first surface of the right lens 110. Therefore, the fifth image IM5 may be formed on the retina of the user's right eye RE.

The sixth image IM6 displayed on the sixth area A6 of the first display device 210 may be focused on the sixth right reflector 416 by a first convex lens 316a and a second convex lens 316b of the sixth right condenser 316. The sixth right reflector 416 may reflect the sixth image IM6 incident from the first side surface of the right lens 110 to the first surface of the right lens 110. Therefore, the sixth image IM6 may be formed on the retina of the user's right eye RE.

As illustrated in FIGS. 10 through 12, the first image IM1, the second image IM2, the third image IM3, the fourth image IM4, the fifth image IM5, and the sixth image IM6 displayed on the first area A1, the second area A2, the third area A3, the fourth area A4, the fifth area A5, and the sixth area A6 of the first display device 210 may be formed on the retina of the user's right eye RE by the first right reflector 411, the second right reflector 412, the third right reflector 413, the fourth right reflector 414, the fifth right reflector 415, and the sixth right reflector 416, respectively. Therefore, the user may see one image, into which the first image IM1, the second image IM2, the third image IM3, the fourth image IM4, the fifth image IM5, and the sixth image IM6 are combined, through the right eye RE. Since the user can see an image into which the first image IM1, the second image IM2, the third image IM3, the fourth image IM4, the fifth image IM5, and the sixth image IM6 are combined together with an image of reality without moving the focus on the image of reality, augmented reality can be provided to the user.

An augmented reality providing method using a left lens 120, a second display device 220, left condensers 320, and left reflectors 420 is substantially the same as that described above with reference to FIGS. 10 through 12, and thus a description thereof is omitted.

Figure 13:
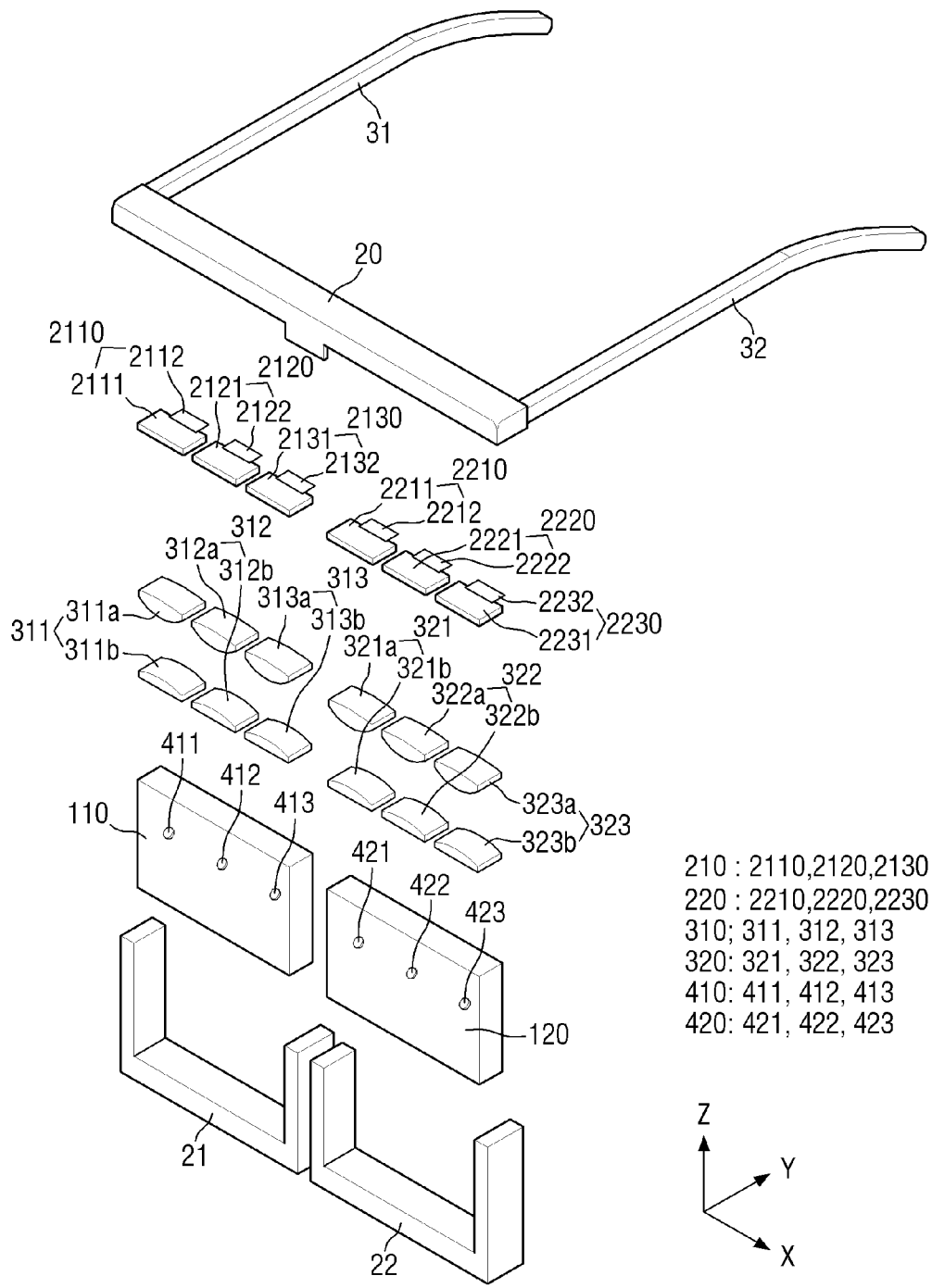
FIG. 13 is an exploded perspective view of an optical device according to an embodiment.

FIG. 13 is an exploded perspective view of an optical device 1 according to an embodiment.

The embodiment of FIG. 13 is different from the embodiment of FIG. 2 only in that a first display device 210 includes a first right display device 2110, a second right display device 2120 and a third right display device 2130, and a second display device 220 includes a first left display device 2210, a second left display device 2220, and a third left display device 2230. In FIG. 13, redundant descriptions of elements and features identical to those of the embodiment of FIG. 2 will be omitted.

Referring to FIG. 13, the first right display device 2110, the second right display device 2120, and the third right display device 2130 may be disposed on a first side surface of a right lens 110. The first right display device 2110, the second right display device 2120, and the third right display device 2130 may be disposed in the first direction (X-axis direction). The first right display device 2110, the second right display device 2120, and the third right display device 2130 may have substantially the same size, but the disclosure is not limited thereto.

Each of the first right display device 2110, the second right display device 2120, and the third right display device 2130 may display a virtual image for realizing augmented reality. The first right display device 2110 may include a first right display panel 2111 and a first right circuit board 2112. The second right display device 2120 may include a second right display panel 2121 and a second right circuit board 2122. The third right display device 2130 may include a third right display panel 2131 and a third right circuit board 2132.

Each of the first right display panel 2111, the second right display panel 2121, and the third right display panel 2131 may be an organic light emitting display panel or a quantum dot light emitting display panel including quantum dots. Each of the first right display panel 2111, the second right display panel 2121, and the third right display panel 2131 can be curved or bent due to its flexibility.

The first right circuit board 2112 may be attached to an end of the first right display panel 2111. The first right display panel 2111 may receive digital video data from an external source through the first right circuit board 2112 and receive power from an external power supply unit. The second right circuit board 2122 may be attached to an end of the second right display panel 2121. The second right display panel 2121 may receive digital video data from the external source through the second right circuit board 2122 and receive power from the external power supply unit. The third right circuit board 2132 may be attached to an end of the third right display panel 2131. The third right display panel 2131 may receive digital video data from the external source through the third right circuit board 2132 and receive power from the external power supply unit. The first right circuit board 2112, the second right circuit board 2122, and the third right circuit board 2132 may be flexible printed circuit boards and thus may be curved or bent.

The first left display device 2210, the second left display device 2220, and the third left display device 2230 may be disposed on a first side surface of a left lens 120. The first left display device 2210, the second left display device 2220, and the third left display device 2230 may be disposed in the first direction (X-axis direction). The first left display device 2210, the second left display device 2220, and the third left display device 2230 may have substantially the same size, but the disclosure is not limited thereto.

Each of the first left display device 2210, the second left display device 2220, and the third left display device 2230 may display a virtual image for realizing augmented reality. The first left display device 2210 may include a first left display panel 2211 and a first left circuit board 2212. The second left display device 2220 may include a second left display panel 2221 and a second left circuit board 2222. The third left display device 2230 may include a third left display panel 2231 and a third left circuit board 2232.

Each of the first left display panel 2211, the second left display panel 2221, and the third left display panel 2231 may be an organic light emitting display panel or a quantum dot light emitting display panel including quantum dots. Each of the first left display panel 2211, the second left display panel 2221, and the third left display panel 2231 can be curved or bent due to its flexibility.

The first left circuit board 2212 may be attached to an end of the first left display panel 2211. The first left display panel 2211 may receive digital video data from the external source through the first left circuit board 2212 and receive power from the external power supply unit. The second left circuit board 2222 may be attached to an end of the second left display panel 2221. The second left display panel 2221 may receive digital video data from the external source through the second left circuit board 2222 and receive power from the external power supply unit. The third left circuit board 2232 may be attached to an end of the third left display panel 2231. The third left display panel 2231 may receive digital video data from the external source through the third left circuit board 2232 and receive power from the external power supply unit. The first left circuit board 2212, the second left circuit board 2222, and the third left circuit board 2232 may be flexible printed circuit boards and thus may be curved or bent.

Figure 14:
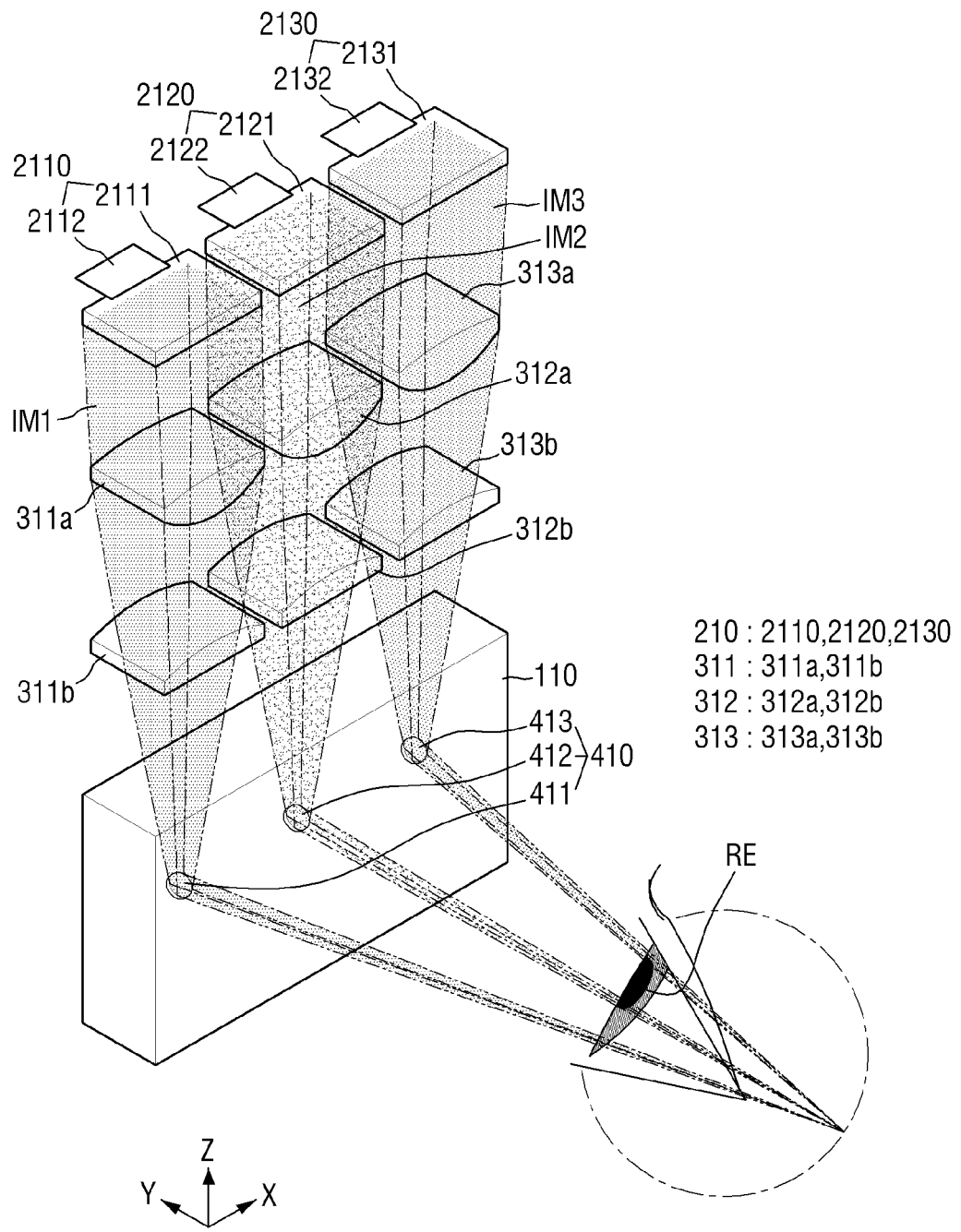
FIGS. 14 through 16 are views for explaining an augmented reality providing method of the optical device according to an embodiment of FIG. 13.
Figure 15:
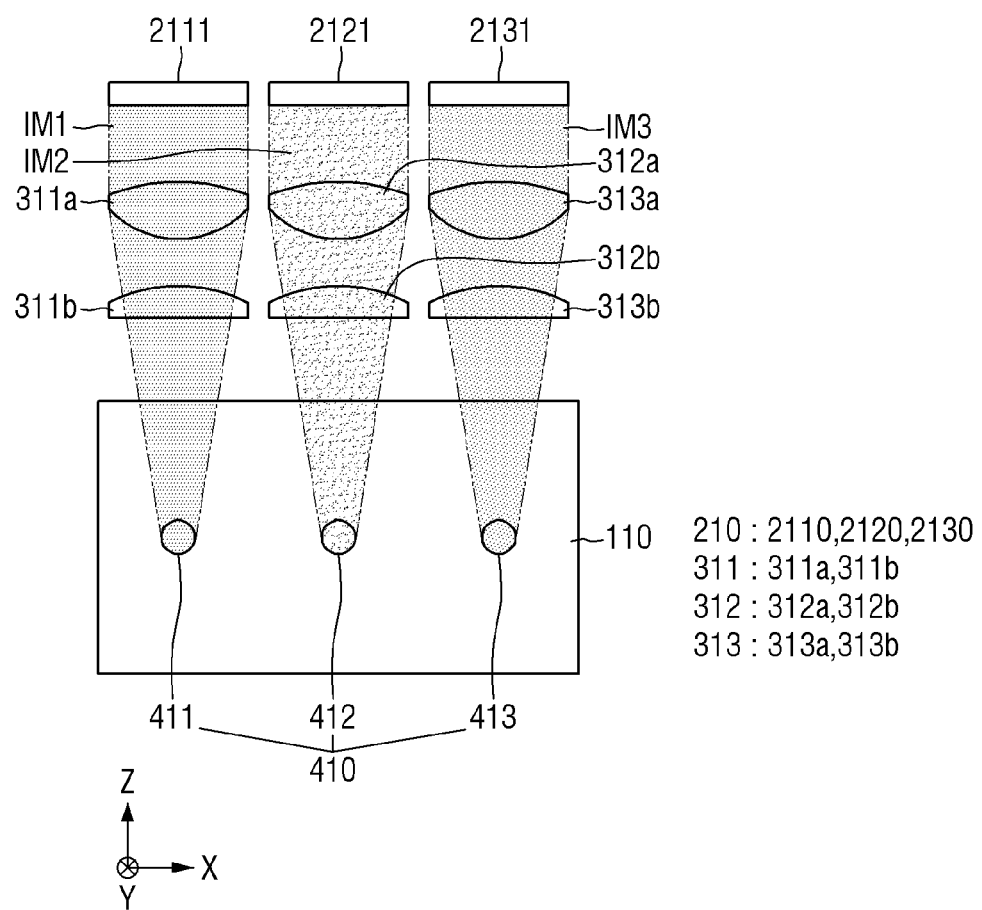
Figure 16:
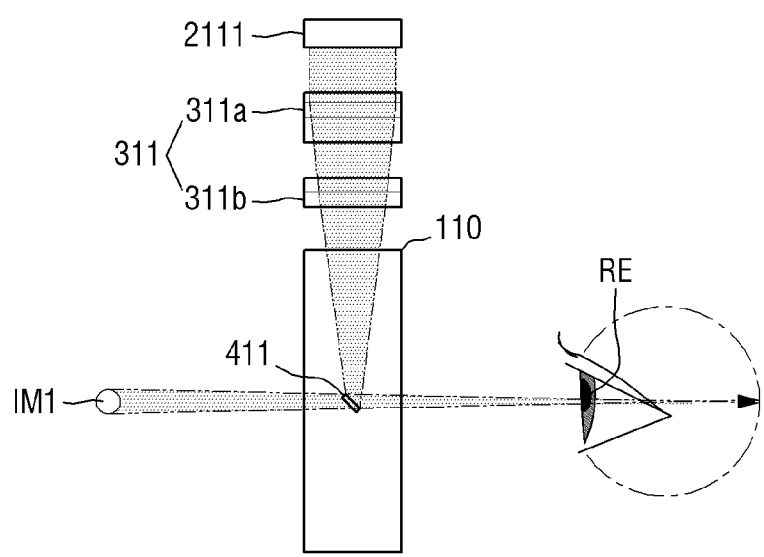

FIGS. 14 through 16 are views for explaining an augmented reality providing method of the optical device according to an embodiment of FIG. 13.

FIG. 14 is a perspective view illustrating the right lens 110, the first right display device 2110, the second right display device 2120, the third right display device 2130, right condensers 311 through 313, and right reflectors 410. FIG. 15 is a plan view seen from a first surface of the right lens 110. FIG. 16 is a right side view seen from a right side surface of the right lens 110.

The embodiment of FIGS. 14 through 16 is different from the embodiment of FIGS. 7 through 9 in that the first display device 210 includes the first right display panel 2111 displaying a first image IM1, the second right display panel 2121 displaying a second image IM2 and the third right display panel 2131 displaying a third image IM3, instead of a first area A1 displaying the first image IM1, a second area A2 displaying the second image IM2, and a third area A3 displaying the third image IM3.

Referring to FIGS. 14 through 16, the first right display panel 2111, the second right display panel 2121, and the third right display panel 2131 may be disposed in the first direction (X-axis direction). A first right condenser 311, a second right condenser 312, and a third right condenser 313 may be disposed in the first direction (X-axis direction). A first right reflector 411, a second right reflector 412, and a third right reflector 413 may be disposed in the first direction (X-axis direction).

The first right display panel 2111, the first right condenser 311, and the first right reflector 411 may overlap each other in the third direction (Z-axis direction). The second right display panel 2121, the second right condenser 312, and the second right reflector 412 may overlap each other in the third direction (Z-axis direction). The third right display panel 2131, the third right condenser 313, and the third right reflector 413 may overlap each other in the third direction (Z-axis direction).

The images IM1 through IM3 displayed on the right display panels 2111, 2121 and 2131 may be focused on the right reflectors 411 through 413 by the right condensers 311 through 313, respectively. Therefore, the images IM1 through IM3 displayed on the right display panels 2111, 2121 and 2131 may be reflected respectively by the right reflectors 411 through 413 to a user's right eye RE.

The first image IM1 displayed on the first right display panel 2111 may be focused on the first right reflector 411 by a first convex lens 311*a* and a second convex lens 311*b* of the first right condenser 311. The first right reflector 411 may reflect the first image IM1 incident from the first side surface of the right lens 110 to the first surface of the right lens 110. Therefore, the first image IM1 may be formed on the retina of the user's right eye RE.

The second image IM2 displayed on the second right display panel 2121 may be focused on the second right reflector 412 by a first convex lens 312*a* and a second convex lens 312*b* of the second right condenser 312. The second right reflector 412 may reflect the second image IM2 incident from the first side surface of the right lens 110 to the first surface of the right lens 110. Therefore, the second image IM2 may be formed on the retina of the user's right eye RE.

The third image IM3 displayed on the third right display panel 2131 may be focused on the third right reflector 413 by a first convex lens 313*a* and a second convex lens 313*b* of the third right condenser 313. The third right reflector 413 may reflect the third image IM3 incident from the first side surface of the right lens 110 to the first surface of the right lens 110. Therefore, the third image IM3 may be formed on the retina of the user's right eye RE.

As illustrated in FIGS. 14 through 16, the first image IM1, the second image IM2, and the third image IM3 displayed on the first right display panel 2111, the second right display panel 2121, and the third right display panel 2131 may be formed on the retina of the user's right eye RE by the first right reflector 411, the second right reflector 412, and the third right reflector 413, respectively. Therefore, the user may see one image, into which the first image IM1, the second image IM2, and the third image IM3 are combined, through the right eye RE. Since the user can see an image into which the first image IM1, the second image IM2 and the third image IM3 are combined together with an image of reality without moving the focus on the image of reality, augmented reality can be provided to the user.

When the first display device 210 includes right display panels 2111, 2121, and 2131, the right condensers 311 through 313 may focus the images IM1 through IM3 of the right display panels 2111, 2121, and 2131 on the right reflectors 411 through 413, respectively. When the first display device 210 does not include right display panels 2111, 2121 and 2131, a right condenser has to focus an image of the first display device 210 on all of the right reflectors 411 through 413. Therefore, refractive power of each of the right condensers 311 through 313 when the first display device 210 includes right display panels 2111, 2121, and 2131 may be smaller than refractive power of the right condenser when the first display device 210 does not include right display panels 2111, 2121 and 2131. Accordingly, a thickness of each of the right condensers 311 through 313 when the first display device 210 includes right display panels 2111, 2121, and 2131 may be smaller than a thickness of the right condenser when the first display device 210 does not include right display panels 2111, 2121 and 2131. Therefore, the size of the optical device 1 can be reduced.

When the first display device 210 does not include right display panels 2111, 2121, and 2131, an image not proceeding to the right reflectors 411 through 413 among images of the first display device 210 may be lost. For example, among the images of the first display device 210, images proceeding to a space between the first right reflector 411 and the second right reflector 412 and to a space between the second right reflector 412 and the third right reflector 413 may be lost. However, when the first display device 210 includes right display panels 2111, 2121, and 2131, since the images IM1 through IM3 of the right display panels 2111, 2121, and 2131 are focused on the right reflectors 411 through 413, respectively, images not proceeding to the right reflectors 411 through 413 can be reduced. Therefore, a luminance loss of an image provided by the optical device 1 can be reduced.

An augmented reality providing method using the left lens 120, the second display device 220, left condensers 320, and left reflectors 420 is substantially the same as that described above with reference to FIGS. 14 through 16, and thus a description thereof is omitted.

Figure 17:
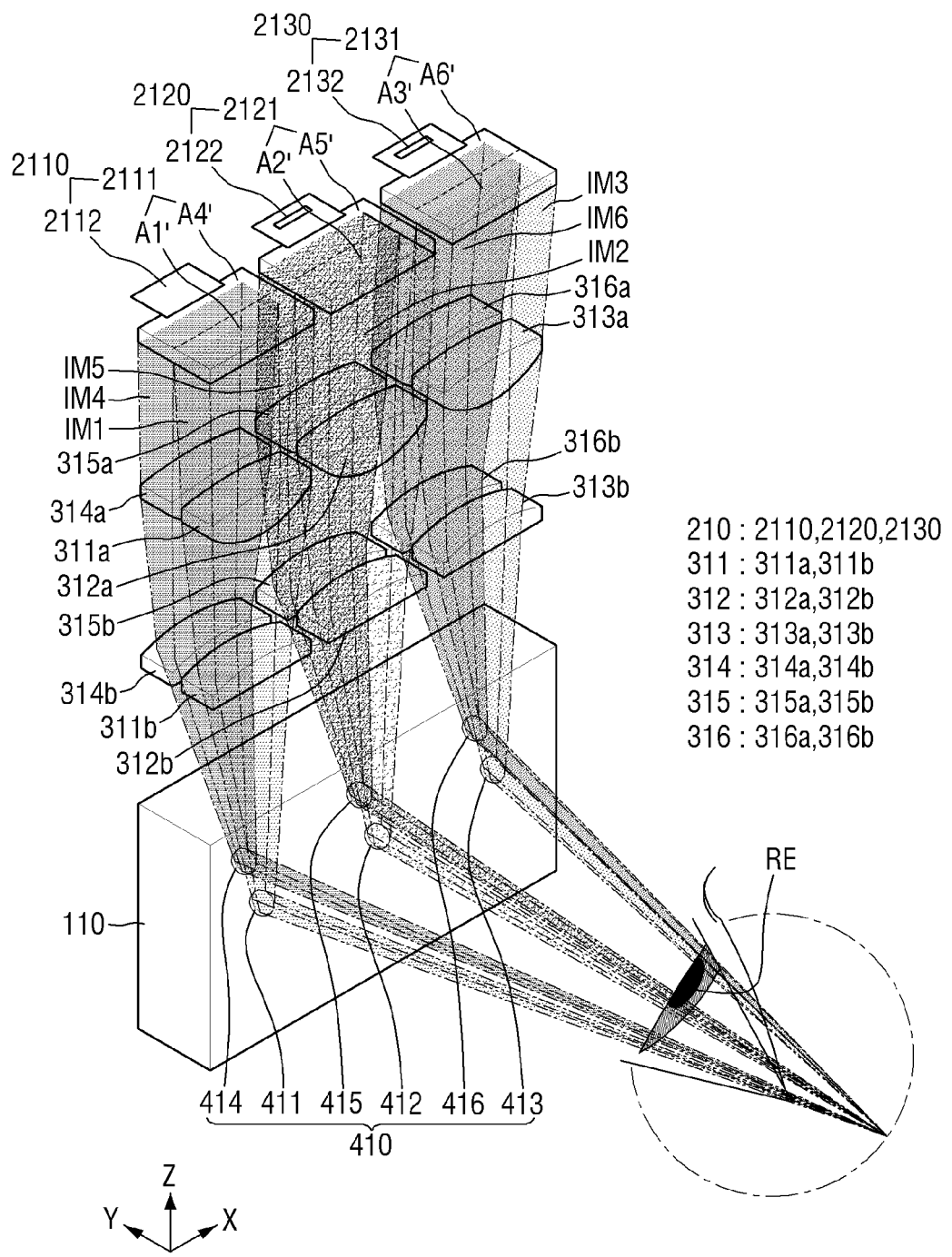
FIGS. 17 through 19 are views for explaining an augmented reality providing method of an optical device according to another embodiment of FIG. 13.
Figure 18:
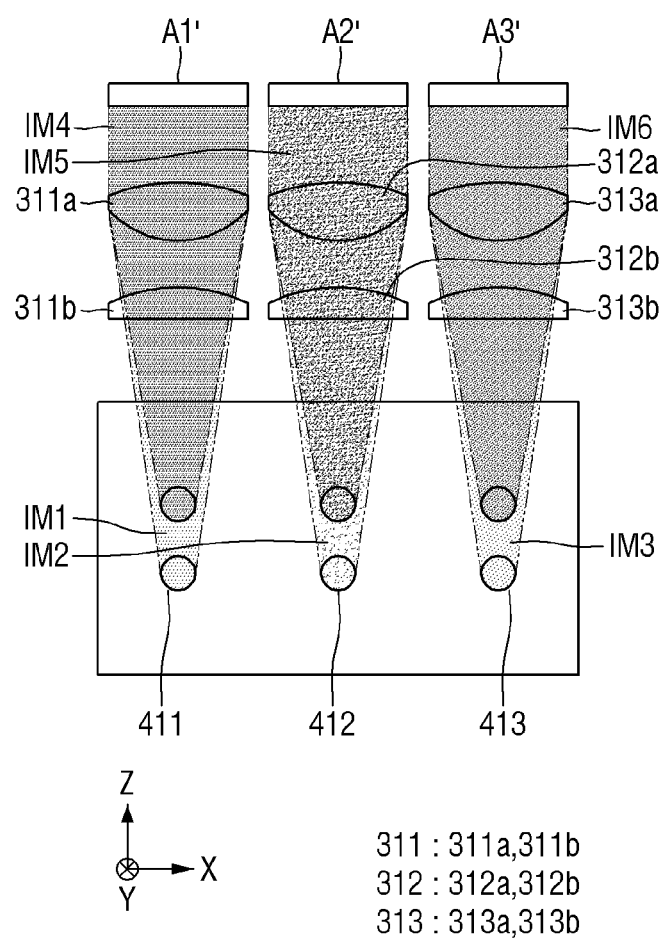
Figure 19:
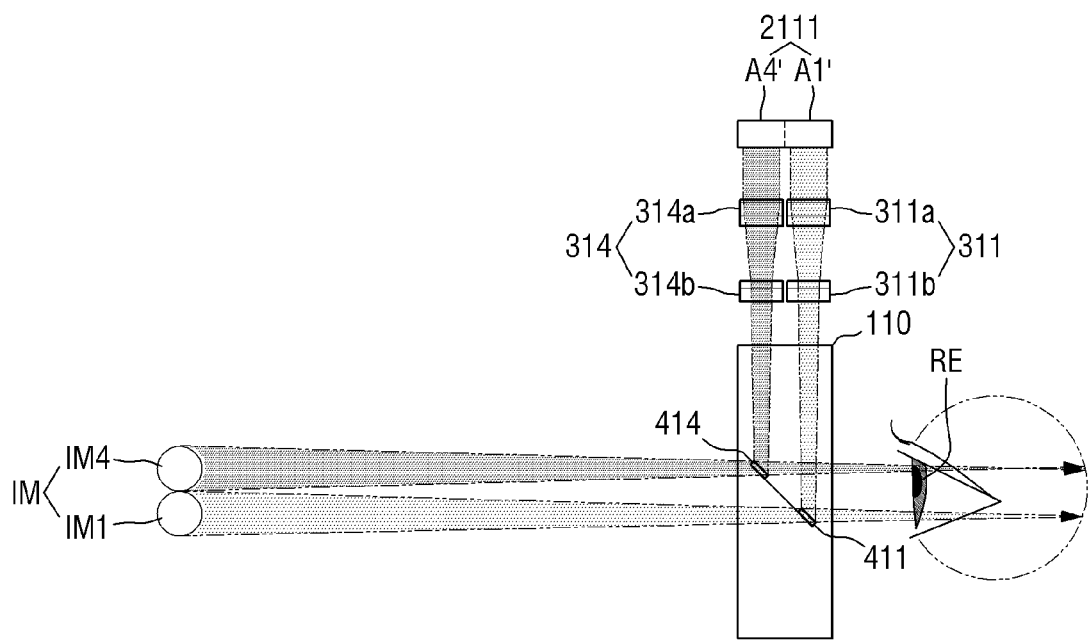

FIGS. 17 through 19 are views for explaining an augmented reality providing method of an optical device according to another embodiment of FIG. 13.

FIG. 17 is a perspective view illustrating a right lens 110, a first display device 210, right condensers 311 through 316, and right reflectors 410. FIG. 18 is a plan view seen from a first surface of the right lens 110. FIG. 19 is a right side view seen from a right side surface of the right lens 110.

The embodiment of FIGS. 17 through 19 is different from the embodiment of FIGS. 14 through 16 in that each of right display panels 2111, 2121, and 2131 includes areas, and the optical device 1 includes six right condensers 311 through 316 and six right reflectors 411 through 416.

Referring to FIGS. 17 through 19, a first right display panel 2111, a second right display panel 2121, and a third right display panel 2131 may be disposed in the first direction (X-axis direction). The first right display panel 2111 may include a first area A1' displaying a first image IM1 and a fourth area A4' displaying a fourth image IM4. The second right display panel 2121 may include a second area A2' displaying a second image IM2 and a fifth area A5' displaying a fifth image IM5. The third right display panel 2131 may include a third area A3' displaying a third image IM3 and a sixth area A6' displaying a sixth image IM6.

The first area A1' and the fourth area A4' of the first right display panel 2111 may be disposed in the second direction (Y-axis direction). The first area A1' and the fourth area A4' of the first right display panel 2111 may contact each other. In an embodiment, a space not displaying an image may be disposed between the first area A1' and the fourth area A4' of the first right display panel 2111.

The second area A2' and the fifth area A5' of the second right display panel 2121 may be disposed in the second direction (Y-axis direction). The second area A2' and the fifth area A5' of the second right display panel 2121 may contact each other. In an embodiment, a space not displaying an image may be disposed between the second area A2' and the fifth area A5' of the second right display panel 2121.

The third area A3' and the sixth area A6' of the third right display panel 2131 may be disposed in the second direction (Y-axis direction). The third area A3' and the sixth area A6' of the third right display panel 2131 may contact each other. In an embodiment, a space not displaying an image may be disposed between the third area A3' and the sixth area A6' of the third right display panel 2131.

A first right condenser 311, a second right condenser 312, and a third right condenser 313 may be disposed in the first direction (X-axis direction). A fourth right condenser 314, a fifth right condenser 315, and a sixth right condenser 316 may be disposed in the first direction (X-axis direction).

The first condenser 311 and the fourth right condenser 314 may be disposed in the second direction (Y-axis direction). The second right condenser 312 and the fifth right condenser 315 may be disposed in the second direction (Y-axis direction). The third right condenser 313 and the sixth right condenser 316 may be disposed in the second direction (Y-axis direction).

The first right condenser 311 may be disposed between the first area A1' of the first right display panel 2111 and a first side surface of the right lens 110. The second right condenser 312 may be disposed between the second area A2' of the second right display panel 2121 and the first side surface of the right lens 110. The third right condenser 313 may be disposed between the third area A3' of the third right display panel 2131 and the first side surface of the right lens 110. The fourth right condenser 314 may be disposed between the fourth area A4' of the first right display panel 2111 and the first side surface of the right lens 110. The fifth right condenser 315 may be disposed between the fifth area A5' of the second right display panel 2121 and the first side surface of the right lens 110. The sixth right condenser 316 may be disposed between the sixth area A6' of the third right display panel 2131 and the first side surface of the right lens 110.

A first right reflector 411, a second right reflector 412, and a third right reflector 413 may be disposed in the first direction (X-axis direction). A fourth right reflector 414, a fifth right reflector 415, and a sixth right reflector 416 may be disposed in the first direction (X-axis direction).

The first right reflector 411 and the fourth right reflector 414 may be disposed in the second direction (Y-axis direction). The second right reflector 412 and the fifth right reflector 415 may be disposed in the second direction (Y-axis direction). The third right reflector 413 and the sixth right reflector 416 may be disposed in the second direction (Y-axis direction).

The images IM1 through IM6 displayed on the areas A1' through A6' of the right display panels 2111, 2121, and 2131 may be focused on the right reflectors 411 through 416 by the right condensers 311 through 316, respectively. Therefore, the images IM1 through IM6 displayed on the areas A1' through A6' of the right display panels 2111, 2121 and 2131 may be reflected respectively by the right reflectors 411 through 416 to a user's right eye RE.

The first image IM1 displayed on the first area A1' of the first right display panel 2111 may be focused on the first right reflector 411 by a first convex lens 311a and a second convex lens 311b of the first right condenser 311. The first right reflector 411 may reflect the first image IM1 incident from the first side surface of the right lens 110 to the first surface of the right lens 110. Therefore, the first image IM1 may be formed on the retina of the user's right eye RE.

The second image IM2 displayed on the second area A2' of the second right display panel 2121 may be focused on the second right reflector 412 by a first convex lens 312a and a second convex lens 312b of the second right condenser 312. The second right reflector 412 may reflect the second image IM2 incident from the first side surface of the right lens 110 to the first surface of the right lens 110. Therefore, the second image IM2 may be formed on the retina of the user's right eye RE.

The third image IM3 displayed on the third area A3' of the third right display panel 2131 may be focused on the third right reflector 413 by a first convex lens 313a and a second convex lens 313b of the third right condenser 313. The third right reflector 413 may reflect the third image IM3 incident from the first side surface of the right lens 110 to the first surface of the right lens 110. Therefore, the third image IM3 may be formed on the retina of the user's right eye RE.

The fourth image IM4 displayed on the fourth area A4' of the first right display panel 2111 may be focused on the fourth right reflector 414 by a first convex lens 314a and a second convex lens 314b of the fourth right condenser 314. The fourth right reflector 414 may reflect the fourth image IM4 incident from the first side surface of the right lens 110 to the first surface of the right lens 110. Therefore, the fourth image IM4 may be formed on the retina of the user's right eye RE.

The fifth image IM5 displayed on the fifth area A5' of the second right display panel 2121 may be focused on the fifth right reflector 415 by a first convex lens 315a and a second convex lens 315b of the fifth right condenser 315. The fifth right reflector 415 may reflect the fifth image IM5 incident from the first side surface of the right lens 110 to the first surface of the right lens 110. Therefore, the fifth image IM5 may be formed on the retina of the user's right eye RE.

The sixth image IM6 displayed on the sixth area A6' of the third right display panel 2131 may be focused on the sixth right reflector 416 by a first convex lens 316a and a second convex lens 316b of the sixth right condenser 316. The sixth right reflector 416 may reflect the sixth image IM6 incident from the first side surface of the right lens 110 to the first surface of the right lens 110. Therefore, the sixth image IM6 may be formed on the retina of the user's right eye RE.

As illustrated in FIGS. 17 through 19, the first image IM1, the second image IM2, the third image IM3, the fourth image IM4, the fifth image IM5, and the sixth image IM6 displayed on the first area A1', the second area A2', the third area A3', the fourth area A4', the fifth area A5', and the sixth area A6' of the first right display panel 2111, the second right display panel 2121, and the third right display panel 2131 may be formed on the retina of the user's right eye RE by the first right reflector 411, the second right reflector 412, the third right reflector 413, the fourth right reflector 414, the fifth right reflector 415, and the sixth right reflector 416, respectively. Therefore, the user may see one image, into which the first image IM1, the second image IM2, the third image IM3, the fourth image IM4, the fifth image IM5, and the sixth image IM6 are combined, through the right eye RE. Since the user can see an image into which the first image IM1, the second image IM2, the third image IM3, the fourth image IM4, the fifth image IM5, and the sixth image IM6 are combined together with an image of reality without moving the focus on the image of reality, augmented reality can be provided to the user.

An augmented reality providing method using a left lens 120, a second display device 220, left condensers 320, and left reflectors 420 is substantially the same as that described above with reference to FIGS. 17 through 19, and thus a description thereof is omitted.

In an optical device according to an embodiment of the inventive concept, images displayed on areas of a display panel or on display panels may be formed on the retina of a user's eye by reflectors, respectively. Therefore, the user can see one image, into which the images are combined, through the eye. Since the user can see an image into which images are combined together with an image of reality without moving the focus on the image of reality, augmented reality can be provided to the user.

In an optical device according to an embodiment of the inventive concept, when a display panel includes areas or when display panels are included, condensers may focus images of the areas or the display panels on reflectors, respectively. Since refractive power of each of the condensers may be low, each of the condensers may be thin. Therefore, the size of the optical device can be reduced.

In an optical device according to an embodiment of the inventive concept, since images displayed on areas of a display panel or on display panels are focused on reflectors, respectively, images not proceeding to the reflectors can be reduced. Therefore, a luminance loss of an image can be reduced.

While the inventive concept has been particularly shown and described with reference to the embodiments thereof, it will be understood by those of ordinary skill in the art that various changes in form and detail may be made thereto without departing from the spirit and scope of the inventive concept as set forth in the following claims.

What is claimed is:

1. An optical device comprising:
a lens comprising a first surface and a plurality of side surfaces;
a display device disposed on a first side surface among the plurality of side surfaces of the lens and displaying a first image in a first area and a second image in a second area;
a first reflector disposed in the lens and reflecting the first image incident on the first side surface of the lens to the first surface;
a second reflector disposed in the lens and reflecting the second image incident on the first side surface of the lens to the first surface;
a first condenser disposed between the lens and the first area of the display device and focusing the first image on the first reflector; and
a second condenser disposed between the lens and the second area of the display device and focusing the second image on the second reflector, wherein
the first area, the first condenser, and the first reflector of a display panel overlap each other in a third direction, and
the second area, the second condenser, and the second reflector of the display panel overlap each other in the third direction.

2. The optical device of claim 1, wherein
the first area and the second area are disposed in a first direction which is a width direction of the lens,
the first reflector and the second reflector are disposed in the first direction, and
the first condenser and the second condenser are disposed in the first direction.

3. The optical device of claim 1, wherein
the display device further comprises a third area displaying a third image, and the first area, the second area, and the third area are disposed in a first direction which is a width direction of the lens.

4. The optical device of claim 3, further comprising a third reflector disposed in the lens and reflecting the third image incident on the first side surface of the lens to the first surface,
wherein the first reflector, the second reflector, and the third reflector are disposed in the first direction.

5. The optical device of claim 4, further comprising a third condenser disposed between the lens and the third area of the display device and focusing the third image on the third reflector.

6. The optical device of claim 1, wherein
the display device further comprises a fourth area displaying a fourth image, and
the first area and the fourth area are disposed in a second direction which is a thickness direction of the lens.

7. The optical device of claim 6, further comprising a fourth reflector disposed in the lens and reflecting the fourth image incident on the first side surface of the lens to the first surface,
wherein the first reflector and the fourth reflector are disposed in the second direction.

8. The optical device of claim 7, further comprising a fourth condenser disposed between the lens and the fourth area of the display device and focusing the fourth image on the fourth reflector.

9. The optical device of claim 8, wherein
the display device further comprises a fifth area displaying a fifth image,
the fourth area and the fifth area are disposed in a first direction which is a width direction of the lens, and
the second area and the fifth area are disposed in the second direction.

10. The optical device of claim 9, further comprising a fifth reflector disposed in the lens and reflecting the fifth image incident on the first side surface of the lens to the first surface, wherein
the fourth reflector and the fifth reflector are disposed in the first direction, and
the second reflector and the fifth reflector are disposed in the second direction.

11. The optical device of claim 10, further comprising a fifth condenser disposed between the lens and the fifth area of the display device and focusing the fifth image on the fifth reflector.

12. The optical device of claim 1, wherein each of the first condenser and the second condenser comprises:
a first convex lens; and
a second convex lens disposed between the first convex lens and the display device.

13. The optical device of claim 12, wherein
the first convex lens is convex toward the second convex lens, and
the second convex lens is convex toward the first convex lens.

14. An optical device comprising:
a lens comprising a first surface and a plurality of side surfaces;
a first sub-display device disposed on a first side surface among the side surfaces of the lens and displaying a first image;
a second sub-display device disposed on the first side surface of the lens and displaying a second image;
a first reflector disposed in the lens and reflecting the first image incident on the first side surface of the lens to the first surface;
a second reflector disposed in the lens and reflecting the second image incident on the first side surface of the lens to the first surface;
a first condenser disposed between the lens and the first sub-display device and focusing the first image on the first reflector; and
a second condenser disposed between the lens and the second sub-display device and focusing the second image on the second reflector, wherein
a first area, a first condenser, and the first reflector of a display panel overlap each other in a third direction, and
a second area, a second condenser, and the second reflector of the display panel overlap each other in the third direction.

15. The optical device of claim 14, wherein
the first sub-display device and the second sub-display device are disposed in a first direction which is a width direction of the lens,
the first reflector and the second reflector are disposed in the first direction, and
the first condenser and the second condenser are disposed in the first direction.

16. The optical device of claim 14, further comprising a third sub-display device disposed on the first side surface and displaying a third image,
wherein the first sub-display device, the second sub-display device, and the third sub-display device are disposed in a first direction which is a width direction of the lens.

17. The optical device of claim 16, further comprising a third reflector disposed in the lens and reflecting the third image incident on the first side surface of the lens to the first surface,
wherein the first reflector, the second reflector, and the third reflector are disposed in the first direction.

18. The optical device of claim 17, further comprising a third condenser disposed between the lens and the third sub-display device and focusing the third image on the third reflector.

19. The optical device of claim 14, wherein
the first sub-display device comprises the first area displaying the first image and a fourth area displaying a fourth image, and
the first area and the fourth area are disposed in a second direction which is a thickness direction of the lens.

20. The optical device of claim 19, further comprising:
a fourth reflector disposed in the lens and reflecting the fourth image incident on the first side surface of the lens to the first surface; and
a fourth condenser disposed between the lens and the fourth area of the first sub-display device and focusing the fourth image on the fourth reflector,
wherein the first reflector and the fourth reflector are disposed in the second direction.

* * * * *